(12) United States Patent
Setchell

(10) Patent No.: US 10,474,879 B2
(45) Date of Patent: Nov. 12, 2019

(54) AUTOMATIC HANDS FREE SERVICE REQUESTS

(71) Applicant: GOOGLE INC., Mountain View, CA (US)

(72) Inventor: William Setchell, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 47 days.

(21) Appl. No.: 15/664,640

(22) Filed: Jul. 31, 2017

(65) Prior Publication Data

US 2018/0032798 A1 Feb. 1, 2018

Related U.S. Application Data

(60) Provisional application No. 62/369,161, filed on Jul. 31, 2016.

(51) Int. Cl.
*G06K 9/00* (2006.01)
*G06Q 20/40* (2012.01)
(Continued)

(52) U.S. Cl.
CPC ..... *G06K 9/00288* (2013.01); *G06K 9/00255* (2013.01); *G06Q 20/20* (2013.01);
(Continued)

(58) Field of Classification Search
CPC ........... G06Q 20/405; G06Q 20/40145; G06Q 20/20; G06Q 20/40; G06Q 20/227; G06K 9/00288; G06K 9/00255; H04L 41/5041
See application file for complete search history.

(56) References Cited

U.S. PATENT DOCUMENTS 5,280,527 A * 1/1994 Gullman ............ G06K 19/0718
713/184
6,185,545 B1 2/2001 Resnick et al.
(Continued)

FOREIGN PATENT DOCUMENTS

EP 1 246 144 A2 10/2002
JP 2006-139476 A 6/2006
(Continued)

OTHER PUBLICATIONS

Lander, "United Kingdom Office Action received for United Kingdom Patent Application No. 1709634.8", dated Nov. 16, 2017, 8 pages.
(Continued)

*Primary Examiner* — Jon Chang
(74) *Attorney, Agent, or Firm* — Johnson, Marcou & Isaacs, LLC

(57) ABSTRACT

A service device processes a service request using account information of a user. The service device captures a first image of the user, generates a first user facial template based on the first image, and transmits the first user facial template with the account information to a service processing system. The user arrives at the service device to initiate a subsequent service request. The service device captures a second image of the user and generates a second user facial template based on the second image and searches for the first facial template matching the generated second facial template. The service device transmits a first stored matching facial template to the service processing system and a request for account information. The service device receives stored account information associated with the stored first facial template from the service processing system. The service device processes the subsequent service request using the account information.

22 Claims, 7 Drawing Sheets

US 10,474,879 B2

Page 2

(51) Int. Cl.
*G06Q 20/20* (2012.01)
*H04L 12/24* (2006.01)
*G06Q 20/22* (2012.01)

(52) U.S. Cl.
CPC ......... *G06Q 20/227* (2013.01); *G06Q 20/405* (2013.01); *G06Q 20/40145* (2013.01); *H04L 41/5041* (2013.01); *G06Q 20/40* (2013.01)

(56) References Cited

U.S. PATENT DOCUMENTS

| | | |
|---|---|---|
| 6,230,148 B1 | 5/2001 | Pare, Jr. et al. |
| 6,601,762 B2 | 8/2003 | Piotrowski |
| 6,766,306 B1 | 7/2004 | Matsuyama |
| 6,783,459 B2 | 8/2004 | Cumbers |
| 6,847,953 B2 | 1/2005 | Kuo |
| 6,934,381 B1 | 8/2005 | Klein et al. |
| 7,665,657 B2 | 2/2010 | Huh |
| 7,761,381 B1 | 7/2010 | Fitch et al. |
| 8,254,647 B1 | 8/2012 | Nechyba et al. |
| 8,396,809 B1 | 3/2013 | Raff et al. |
| 8,558,663 B2 | 10/2013 | Newman et al. |
| 8,694,352 B1 | 4/2014 | Hawkins et al. |
| 8,694,792 B2 * | 4/2014 | Whillock ........... G07C 9/00158 705/18 |
| 8,768,838 B1 | 7/2014 | Hoffman |
| 8,793,509 B1 | 7/2014 | Nelson et al. |
| 8,930,274 B1 | 1/2015 | Brickell et al. |
| 9,229,623 B1 | 1/2016 | Penilla et al. |
| 9,264,850 B1 | 2/2016 | Lee |
| 9,373,112 B1 | 6/2016 | Henderson et al. |
| 9,519,901 B1 | 12/2016 | Dorogusker |
| 9,619,803 B2 | 4/2017 | Chandrasekaran et al. |
| 9,652,759 B2 | 5/2017 | Chitilian et al. |
| 9,652,791 B1 | 5/2017 | Brock |
| 9,665,858 B1 | 5/2017 | Kumar |
| 9,747,587 B2 | 8/2017 | Diehl |
| 9,760,905 B2 | 9/2017 | Yoder et al. |
| 9,770,206 B2 | 9/2017 | Ashokan |
| 9,805,366 B1 | 10/2017 | Wilson et al. |
| 9,881,303 B2 | 1/2018 | Vohra et al. |
| 9,972,004 B1 | 5/2018 | Donavalli et al. |
| 10,185,958 B2 | 1/2019 | Henderson et al. |
| 2001/0013545 A1 | 8/2001 | Hogan |
| 2001/0034724 A1 | 10/2001 | Thieme |
| 2001/0044744 A1 | 11/2001 | Rhoads |
| 2002/0026575 A1 | 2/2002 | Wheeler et al. |
| 2002/0132663 A1 | 9/2002 | Cumbers |
| 2002/0164022 A1 | 11/2002 | Strasser et al. |
| 2003/0028481 A1 | 2/2003 | Flitcroft et al. |
| 2003/0149661 A1 | 8/2003 | Mitchell et al. |
| 2004/0039692 A1 | 2/2004 | Shields et al. |
| 2004/0117625 A1 | 6/2004 | Grawrock |
| 2005/0129286 A1 | 6/2005 | Hekimian |
| 2005/0165667 A1 | 7/2005 | Cox |
| 2005/0246293 A1 | 11/2005 | Ong |
| 2006/0056662 A1 * | 3/2006 | Thieme ............... G06K 9/00067 382/115 |
| 2006/0203776 A1 | 9/2006 | Persaud et al. |
| 2006/0235761 A1 | 10/2006 | Johnson |
| 2007/0084913 A1 | 4/2007 | Weston |
| 2007/0183634 A1 | 8/2007 | Dussich et al. |
| 2007/0203999 A1 | 8/2007 | Townsley et al. |
| 2008/0169903 A1 | 7/2008 | Fein et al. |
| 2009/0005987 A1 | 1/2009 | Vengroff et al. |
| 2009/0018924 A1 | 1/2009 | Roberts |
| 2009/0140838 A1 | 6/2009 | Newman et al. |
| 2009/0292641 A1 | 11/2009 | Weiss |
| 2009/0313129 A1 | 12/2009 | Rothschild |
| 2009/0325606 A1 | 12/2009 | Farris |
| 2009/0327133 A1 | 12/2009 | Aharoni et al. |
| 2010/0084462 A1 | 4/2010 | Scipioni et al. |
| 2010/0114776 A1 | 5/2010 | Weller et al. |
| 2010/0211966 A1 | 8/2010 | Zhang et al. |
| 2011/0047045 A1 | 2/2011 | Brody et al. |
| 2011/0161233 A1 | 6/2011 | Tieken |
| 2011/0178883 A1 | 7/2011 | Granbery et al. |
| 2011/0190055 A1 | 8/2011 | Leyvand et al. |
| 2011/0257985 A1 | 10/2011 | Goldstein |
| 2011/0258122 A1 | 10/2011 | Shader et al. |
| 2011/0264543 A1 | 10/2011 | Taveau et al. |
| 2011/0295707 A1 | 12/2011 | Gui et al. |
| 2011/0307403 A1 | 12/2011 | Rostampour et al. |
| 2012/0030006 A1 | 2/2012 | Yoder et al. |
| 2012/0115512 A1 | 5/2012 | Grainger et al. |
| 2012/0166314 A1 | 6/2012 | Kimberg |
| 2012/0213420 A1 | 8/2012 | Steiner |
| 2012/0257797 A1 | 10/2012 | Leyvand et al. |
| 2012/0284193 A1 | 11/2012 | Bharghavan et al. |
| 2012/0316953 A1 | 12/2012 | Ramchandani et al. |
| 2013/0006784 A1 | 1/2013 | Krauss et al. |
| 2013/0006810 A1 | 1/2013 | Elias |
| 2013/0024308 A1 | 1/2013 | Ramaswamy et al. |
| 2013/0031006 A1 | 1/2013 | McCullagh et al. |
| 2013/0035979 A1 | 2/2013 | Tenbrock |
| 2013/0132274 A1 | 5/2013 | Henderson et al. |
| 2013/0134215 A1 | 5/2013 | Ramachandran et al. |
| 2013/0226791 A1 | 8/2013 | Springer et al. |
| 2013/0226800 A1 | 8/2013 | Patel et al. |
| 2013/0275247 A1 | 10/2013 | Ramaratnam et al. |
| 2013/0282502 A1 | 10/2013 | Jooste |
| 2013/0282582 A1 | 10/2013 | Pereira et al. |
| 2013/0297730 A1 | 11/2013 | Zhang et al. |
| 2013/0346201 A1 | 12/2013 | Bilange |
| 2014/0006123 A1 | 1/2014 | Kepecs |
| 2014/0032415 A1 | 1/2014 | Lee et al. |
| 2014/0040051 A1 | 2/2014 | Ovick et al. |
| 2014/0040125 A1 | 2/2014 | Kunz et al. |
| 2014/0040135 A1 | 2/2014 | Ovick et al. |
| 2014/0040139 A1 | 2/2014 | Brudnicki et al. |
| 2014/0053255 A1 | 2/2014 | Lindteigen et al. |
| 2014/0067649 A1 | 3/2014 | Kannan et al. |
| 2014/0067679 A1 * | 3/2014 | O'Reilly ................. G06F 21/32 705/44 |
| 2014/0074709 A1 | 3/2014 | Green et al. |
| 2014/0086590 A1 | 3/2014 | Ganick et al. |
| 2014/0164254 A1 | 6/2014 | Dimmick |
| 2014/0165187 A1 | 6/2014 | Daesung et al. |
| 2014/0189808 A1 | 7/2014 | Mahaffey et al. |
| 2014/0201080 A1 * | 7/2014 | Just .................. G06Q 30/0601 705/44 |
| 2014/0222596 A1 * | 8/2014 | S ............................ G06Q 20/12 705/18 |
| 2014/0227999 A1 | 8/2014 | Ferlin |
| 2014/0237587 A1 | 8/2014 | Forbes et al. |
| 2014/0279458 A1 | 9/2014 | Holman et al. |
| 2014/0330659 A1 | 11/2014 | Yopp et al. |
| 2014/0351072 A1 | 11/2014 | Wieler et al. |
| 2014/0351132 A1 | 11/2014 | Wieler et al. |
| 2014/0372128 A1 | 12/2014 | Sheets et al. |
| 2015/0006271 A1 | 1/2015 | Oppenheim et al. |
| 2015/0012418 A1 | 1/2015 | Chu |
| 2015/0013003 A1 | 1/2015 | Osterlund et al. |
| 2015/0046990 A1 | 2/2015 | Oberheide et al. |
| 2015/0066671 A1 | 3/2015 | Nichols et al. |
| 2015/0079942 A1 | 3/2015 | Kostka et al. |
| 2015/0081550 A1 | 3/2015 | Priebatsch et al. |
| 2015/0106216 A1 | 4/2015 | Kenderov |
| 2015/0120473 A1 | 4/2015 | Jung et al. |
| 2015/0161417 A1 | 6/2015 | Kaplan et al. |
| 2015/0170145 A1 | 6/2015 | Patel et al. |
| 2015/0181384 A1 | 6/2015 | Mayor et al. |
| 2015/0186871 A1 | 7/2015 | Laracey |
| 2015/0261787 A1 | 9/2015 | Hu et al. |
| 2015/0269583 A1 * | 9/2015 | Taylor ............... G06Q 20/40145 705/44 |
| 2015/0302412 A1 | 10/2015 | Bhanoo |
| 2015/0309569 A1 | 10/2015 | Kohlhoff et al. |
| 2015/0356563 A1 | 12/2015 | Vohra et al. |
| 2015/0371234 A1 | 12/2015 | Huang et al. |
| 2015/0373762 A1 | 12/2015 | Raj et al. |
| 2015/0379506 A1 | 12/2015 | Griffin |
| 2015/0379650 A1 | 12/2015 | Theobald |
| 2016/0012413 A1 | 1/2016 | Chitilian et al. |

(56) References Cited

U.S. PATENT DOCUMENTS

| | | |
|---|---|---|
| 2016/0012414 A1 | 1/2016 | Chitilian et al. |
| 2016/0012420 A1 | 1/2016 | Chitilian et al. |
| 2016/0012421 A1 | 1/2016 | Chitilian et al. |
| 2016/0012422 A1 | 1/2016 | Chitilian et al. |
| 2016/0012423 A1 | 1/2016 | Chitilian et al. |
| 2016/0012426 A1 | 1/2016 | Chitilian et al. |
| 2016/0012428 A1 | 1/2016 | Haldenby et al. |
| 2016/0012430 A1 | 1/2016 | Chandrasekaran et al. |
| 2016/0019547 A1 | 1/2016 | Gurnani et al. |
| 2016/0042346 A1 | 2/2016 | Pastore et al. |
| 2016/0048846 A1 | 2/2016 | Douglas et al. |
| 2016/0063435 A1 | 3/2016 | Shah et al. |
| 2016/0063459 A1 | 3/2016 | Li et al. |
| 2016/0321633 A1 | 11/2016 | Chandrasekaran et al. |
| 2016/0321671 A1 | 11/2016 | Chandrasekaran et al. |
| 2016/0323274 A1* | 11/2016 | Chandrasekaran ......................... H04L 63/0861 |
| 2016/0342967 A1 | 11/2016 | Proctor et al. |
| 2016/0353274 A1 | 12/2016 | Chichierchia |
| 2016/0364701 A1 | 12/2016 | Nayfack |
| 2017/0024731 A1 | 1/2017 | Gullett et al. |
| 2017/0053276 A1 | 2/2017 | Gullett et al. |
| 2017/0091765 A1 | 3/2017 | Lloyd et al. |
| 2017/0116589 A1 | 4/2017 | Krishnaiah |
| 2017/0193480 A1 | 7/2017 | Chandrasekaran et al. |
| 2017/0221065 A1 | 8/2017 | Chitilian et al. |
| 2017/0255923 A1 | 9/2017 | Dieter et al. |
| 2017/0255941 A1 | 9/2017 | Chandrasekaran et al. |
| 2017/0255942 A1 | 9/2017 | Chandrasekaran et al. |
| 2017/0300957 A1 | 10/2017 | Yoder et al. |
| 2017/0323299 A1* | 11/2017 | Davis ............... G06Q 20/40145 |
| 2017/0364901 A1 | 12/2017 | Chandrasekaran et al. |
| 2019/0130408 A1 | 5/2019 | Chitilian et al. |

FOREIGN PATENT DOCUMENTS

| | | | |
|---|---|---|---|
| JP | 2011-014174 A | 1/2011 | |
| JP | 2014-099156 A | 5/2014 | |
| JP | 2014-191416 A | 10/2014 | |
| JP | 2016-024758 A | 2/2016 | |
| KR | 10-2012-0011776 A | 2/2012 | |
| KR | 10-1242390 B1 | 3/2013 | |
| KR | 10-2015-0003922 A | 1/2015 | |
| KR | 10-2015-0011046 A | 1/2015 | |
| WO | 02/099758 A1 | 12/2002 | |
| WO | 2005/031663 A2 | 4/2005 | |
| WO | 2008/101142 A1 | 8/2008 | |
| WO | 2014/092233 A1 | 6/2014 | |
| WO | 2014/130222 A1 | 8/2014 | |
| WO | 2014/182787 A2 | 11/2014 | |
| WO | 2015/072191 A1 | 5/2015 | |
| WO | 2016/007445 A1 | 1/2016 | |
| WO | 2016/007801 A1 | 1/2016 | |
| WO | 2016/007934 A1 | 1/2016 | |
| WO | 2016/007445 A8 | 3/2016 | |
| WO | 2016/033468 A1 | 3/2016 | |
| WO | 2017/151700 A1 | 9/2017 | |
| WO | 2017/151815 A1 | 9/2017 | |
| WO | 2017/151825 A1 | 9/2017 | |
| WO | 2017/222837 A1 | 12/2017 | |
| WO | 2018/026688 A1 | 2/2018 | |

OTHER PUBLICATIONS

Raza, "U.S. Office Action issued in copending U.S. Appl. No. 14/540,031, filed Nov. 12, 2014," dated Nov. 24, 2017, 19 pages.
Van Praagh, "International Search Report and Written Opinion issued in International Application No. PCT/US2017/044603", dated Nov. 8, 2017, 12 pages.
Berthon, "International Search Report and Written Opinion issued in International Application No. PCT/US2017/036833", dated Sep. 18, 2017, 13 pages.
McCoy, "U.S. Office Action issued in copending U.S. Appl. No. 15/447,083, filed Mar. 1, 2017", dated Dec. 6, 2017, 14 pages.
Getachew, "U.S. Office Action issued in copending U.S. Appl. No. 14/540,034, filed Nov. 12, 2014", dated Dec. 19, 2017, 26 Pages.
Getachew, "U.S. Office Action issued in copending U.S. Appl. No. 14/540,036, filed Nov. 12, 2014", dated Dec. 19, 2017, 24 Pages.
Raza, "U.S. Office Action issued in copending U.S. Appl. No. 14/540,004, filed Nov. 12, 2014", dated Dec. 26, 2017, 17 pages.
Getachew, "U.S. Office Action issued in copending U.S. Appl. No. 14/540,034, filed Nov. 12, 2014", dated Jul. 25, 2018, 26 pages.
Getachew, "U.S. Office Action issued in copending U.S. Appl. No. 14/540,036, filed Nov. 12, 2014", dated Aug. 3, 2018, 18 pages.
McCoy, "U.S. Office Action issued in copending U.S. Appl. No. 15/447,083, filed Jun. 22, 2018", dated Jun. 22, 2018, 17 pages.
Raymaekers "European Office Action issued in European Application No. 15741455.8", dated Jan. 8, 2019, 14 pages.
Baharlou, "International Preliminary Report on Patentability issued in International Application No. PCT/US2015/040067", dated Jan. 26, 2017, 7 pages.
Berthon, "International Search Report and Written Opinion issued in International Application No. PCT/US2015/040067", dated Oct. 26, 2015, 8 pages.
Berthon, "International Search Report and Written Opinion issued in International Application No. PCTUS2015/039836", dated Oct. 26, 2015, 10 pages.
Getachew, "U.S. Office Action issued in copending U.S. Appl. No. 14/540,034, filed Nov. 12, 2014", dated Jun. 23, 2017, 15 pages.
Getachew, "U.S. Office Action issued in copending U.S. Appl. No. 14/540,036, filed Nov. 12, 2014", dated Jun. 16, 2017, 16 pages.
Nickitas-Etienne, "International Preliminary Report on Patentability issued in International Application No. PCT/US2015/039275", dated Jan. 26, 2017, 9 pages.
Peuser, "International Search Report and Written Opinion issued in International Application No. PCT/US2015/039275", dated Oct. 8, 2015, 11 pages.
Raza, "U.S. Office Action issued in copending U.S. Appl. No. 14/540,001, filed Nov. 12, 2014", dated Aug. 4, 2017, 17 pages.
Raza, "U.S. Office Action issued in copending U.S. Appl. No. 14/540,004, filed Nov. 12, 2014", dated Jun. 21, 2017, 17 pages.
Raza, "U.S. Office Action issued in copending U.S. Appl. No. 14/540,009, filed Nov. 12, 2014", dated Sep. 7, 2017, 15 pages.
Reichert, "International Search Report and Written Opinion issued in International Application No. PCT/US2017/020291", dated May 9, 2017, 14 pages.
Thomas, "International Search Report and Written Opinion issued in International Application No. PCT/US2017/039836", dated May 25, 2017, 10 pages.
Toscano Oliveros, "International Search Report and Written Opinion issued in International Application No. PCT/US2017/020270", dated May 9, 2017, 13 pages.
Unknown, "Beacon Paypal", Connection Made, Jul. 17, 2014, 6 pages.
Unknown, "Paypal Debuts its Newest Hardward, Beacon, a Bluetooth LE Enabled Device for Hands-Free Check Ins and Payments", Sep. 9, 2013, 29 pages.
Winter, "U.S. Office Action issued in copending U.S. Appl. No. 14/539,997, filed Nov. 12, 2014", dated Jun. 17, 2015, 11 pages.
Winter, "U.S. Office Action issued in copending U.S. Appl. No. 14/539,997, filed Nov. 12, 2014", dated Dec. 31, 2015, 15 pages.
Winter, "U.S. Office Action issued in copending U.S. Appl. No. 14/539,997, filed Nov. 12, 2014", dated Jun. 30, 2016, 16 pages.
Wittmann-Regis, "International Preliminary Report on Patentability issued in International Application No. PCT/US2015/039836", dated Jan. 26, 2017, 8 pages.
Raza, "U.S. Office Action issued in copending U.S. Appl. No. 14/540,031, filed Nov. 12, 2014", dated Jun. 13, 2018, 19 pages.
Raza, "U.S. Office Action issued in copending U.S. Appl. No. 14/540,001, filed Nov. 12, 2014", dated Jan. 9, 2018, 17 pages.
Raza, "U.S. Office Action issued in copending U.S. Appl. No. 14/540,009, filed Nov. 12, 2014", dated Jan. 9, 2018, 16 pages.
U.S. Appl. No. 14/539,997 to Chitilian et al. filed Nov. 12, 2014.
U.S. Appl. No. 14/540,001 to Chitilian et al. filed Nov. 12, 2014.
U.S. Appl. No. 14/540,004 to Chitilian et al. filed Nov. 12, 2014.
U.S. Appl. No. 14/540,009 to Chitilian et al. filed Nov. 12, 2014.

(56) References Cited

OTHER PUBLICATIONS

U.S. Appl. No. 14/540,031 to Chitilian et al. filed Nov. 12, 2014.
U.S. Appl. No. 14/540,034 to Chitilian et al. filed Nov. 12, 2014.
U.S. Appl. No. 14/540,036 to Chitilian et al. filed Nov. 12, 2014.
U.S. Appl. No. 14/797,029 to Chandrasekaran et al. filed Jul. 10, 2015.
U.S. Appl. No. 15/446,990 to Chandrasekaran et al. filed Mar. 1, 2017.
U.S. Appl. No. 15/446,734 to Dieter et al. filed Mar. 1, 2017.
U.S. Appl. No. 15/447,083 to Chandrasekaran et al. filed Mar. 1, 2017.
U.S. Appl. No. 15/492,718 to Chitilian et al. filed Apr. 20, 2017.
U.S. Appl. No. 15/616,895 to Chandrasekaran et al filed Jun. 7, 2017.
Gottschalk, "U.S. Office Action issued in copending U.S. Appl. No. 14/797,029, filed Jul. 10, 2015", dated Oct. 17, 2018, 14 pages.
McCoy, "U.S. Office Action issued in copending U.S. Appl. No. 15/447,083, filed Mar. 1, 2017", dated Nov. 2, 2018, 18 pages.
Gottschalk, "U.S. Office Action issued in copending U.S. Appl. No. 14/797,029, filed Jul. 10, 2015", dated Apr. 9, 2018, 13 Pages.
Winter, "U.S. Office Action issued in copending U.S. Appl. No. 15/492,718, filed Apr. 20, 2017", dated Nov. 27, 2018, 11 pages.
Raza, "U.S. Office Action issued in copending U.S. Appl. No. 14/540,004, filed Nov. 12, 2014", dated May 3, 2018, 15 pages.
Raza, "U.S. Office Action issued in copending U.S. Appl. No. 14/540,001, filed Nov. 12, 2014", filed May 8, 2018, 15 pages.
U.S. Appl. No. 16/233,442 to Varouj Chitilian et al. filed on Dec. 27, 2018.
U.S. Appl. No. 16/238,492 to Varouj Chitilian et al. filed on Jan. 2, 2019.
Baharlou, "International Preliminary Report on Patentability issued in International Application No. PCT/US2017/020270", dated Sep. 13, 2018, 8 pages.
Nickitas-Etienne, "International Preliminary Report on Patentability issued in International Application No. PCT/US2017/020078", dated Sep. 13, 2018, 9 pages.
Nickitas-Etienne, "International Preliminary Report on Patentability issued in International Application No. PCT/US2017/020291", dated Sep. 13, 2018, 8 pages.
Raza, "U.S. Office Action issued in copending U.S. Appl. No. 14/540,031, filed Nov. 12, 2014", dated Oct. 2, 2018, 17 pages.
Bartley "U.S. Office Action issued in copending U.S. Appl. No. 15/446,734, filed Mar. 1, 2017", dated Apr. 1, 2019, 35 pages.
Dega "U.S. Office Action issued in copending U.S. Appl. No. 15/446,990, filed Mar. 1, 2017", dated May 2, 2019, 16 pages.
Getachew "U.S. Office Action issued in copending U.S. Appl. No. 14/540,034, filed Nov. 12, 2014", dated Feb. 19, 2019, 30 pages.
Getachew "U.S. Office Action issued in copending U.S. Appl. No. 14/540,036, filed Nov. 12, 2014", dated Mar. 6, 2019, 23 pages.
McCoy "U.S. Office Action issued in copending U.S. Appl. No. 15/447,083, filed Mar. 1, 2017", dated Apr. 23, 2019, 16 pages.
Raza "U.S. Office Action issued in copending U.S. Appl. No. 14/540,001, filed Nov. 12, 2014", dated Feb. 27, 2019, 10 pages.
Raza "U.S. Office Action issued in copending U.S. Appl. No. 14/540,004, filed Nov. 12, 2014", dated Mar. 25, 2019, 8 pages.
Raymaekers "European Office Action issued in European Application No. 15742466.4", dated Jan. 22, 2019, 11 pages.
Bartley "U.S. Office Action issued in copending U.S. Appl. No. 15/446,734, filed Mar. 1, 2017", dated Jul. 24, 2019, 51 pages.
Berlea "Extended European Search Report issued European Application No. 17760676.1", dated Jul. 30, 2019, 8 pages.
Gottschalk "U.S. Office Action issued in copending U.S. Appl. No. 14/797,029, filed Jul. 10, 2015", dated Jun. 25, 2019, 16 pages.
Park "Korean Office Action issued in Korean Application No. 10-2018-7019869", dated May 28, 2019, 7 pages of English Translation and 7 pages of Korean Office Action.
Winter "U.S. Office Action issued in co-pending U.S. Appl. No. 15/492,718, filed Apr. 20, 2017", dated Jun. 12, 2019, 11 pages.
Kaizuka "Japanese Office Action issued in Japanese Application No. 2018-531520", dated Aug. 5, 2019, 04 pages of English Translation and 03 pages of Japanese Office Action.
Kaizuka "Japanese Office Action issued in Japanese Application No. 2018-536774", dated Aug. 5, 2019, 05 pages of English Translation and 04 pages of Japanese Office Action.
Park "Korean Office Action issued in Korean Application No. 10-2018-7023338", dated Jul. 23, 2019, 7 pages of English Translation and 7 pages of Korean Office Action.
Shah "U.S. Office Action issued in copending U.S. Appl. No. 15/616,895, filed Jun. 7, 2017", dated Aug. 20, 2019, 27 pages.

* cited by examiner

590

Processing a subsequent payment transaction with facial recognition at merchant point of sale device

610

Merchant point of sale device captures facial image of user

620

Merchant point of sale device generates user facial template based on user facial image

630

Merchant point of sale device searches for stored user facial template matching generated user facial template

635

Facial template found? — No → 330, Fig. 3

640 Yes

Merchant point of sale device transmits request for stored payment information associated with matching stored user facial template to payment processing system

650

Merchant point of sale device receives stored payment information associated with matching stored user facial template from payment processing system

660

Merchant point of sale device transmits payment authorization request to issuer system associated with received payment information

670

Issuer system receives payment authorization request and approves payment authorization request

680

Merchant point of sale device receives notice of approved payment authorization request from issuer system

690

Merchant point of sale device transmits receipt to user

AUTOMATIC HANDS FREE SERVICE REQUESTS

CROSS REFERENCE TO RELATED APPLICATION

This application claims priority to U.S. Provisional Patent Application No. 62/369,161 filed Jul. 31, 2016, and entitled "Automatic Hands Free Service Requests," the entire contents of which are hereby fully incorporated herein by reference

TECHNICAL FIELD

The present disclosure relates to identify users making service requests via facial recognition.

BACKGROUND

When consumers make service requests at a service provider system location, many methods of conducting a service request are available. Users may use many different cards or accounts for conducting service requests. The user account identifiers and other data represented by the cards may be communicated to a service provider computing device via magnetic stripes of the cards, near field communication technologies involving user computing devices, and other suitable mechanisms.

Current applications for processing service requests at a service provider system location require a user to perform actions to identify himself by providing user account identifiers or other data to an operator of a service provider system computing device.

SUMMARY

Techniques herein provide computer-implemented methods to identify appropriate account information for use in service requests based on facial recognition of users, the method comprising: receiving, by a service provider computing device, account information associated with a user account and a request to process a first service request; processing, by the service provider computing device, the first service request using the account information associated with the user account; capturing, by the service provider computing device and via a camera device communicatively coupled to the service provider computing device, a first image of the user associated with the user account; generating, by the service provider computing device, a first template comprising a computer code representation of the first image of the user; deleting, by the service provider computing device, the first image of the user associated with the user account; generating, by the service provider computing device, a template identifier associated with the first template; transmitting, by the service provider computing device, the template identifier and the account information associated with the user account to one or more computing devices; receiving, by the service provider computing device, a request to process a second service request; capturing, by the service provider computing device and via the camera device, a second image of the user; generating, by the service provider computing device, a second template based on the second image of the user; identifying, by the service provider computing device, the first template from among a plurality of templates comprising the first template stored on the memory by comparing each template of the plurality of templates comprising the first template against the second template, wherein the similarity of the first template to the second template is greater than a threshold amount; determining, by the service provider computing device, the template identifier associated with the first template; transmitting, to the one or more computing devices by the service provider computing device, the template identifier and a request for the account information associated with the user account; receiving, by the service provider computing device and from the one or more computing devices, the requested account information associated with the user account, wherein the one or more computing devices transmit the account information associated with the template identifier; and processing, by the service provider computing device, the requested second service request using the received account information.

In some implementations the first image of the user comprises a first facial image of the user and the second image of the user comprises a second facial image of the user.

In some implementations the account information comprises account information, e.g., payment account information, wherein processing the first service request comprises processing a first transaction using the account information, and wherein processing the second service request comprises processing a second transaction using the account information. The first and second transactions can be payment transactions.

In some implementations comparing each template of the plurality of templates comprising the first template against the second template comprises comparing one or more particular regions of each template against the one or more corresponding particular regions of the second template.

In some implementations the first template and the second template comprise computer code representations of the first user image and the second user image, respectfully.

In some implementations the method further comprises storing, by the service provider computing device, the first template and the template identifier associated with the first template.

In some implementations capturing at least one of the first image of the user and the second image of the user comprises capturing a video feed of a face of the user or surroundings of the camera device and a facial image of the user is extracted from the captured video feed by determining a particular frame of the video feed and area of the instance of the video feed corresponding to the face of the user and extracting the particular frame of the captured video.

In some implementations computer-implemented methods are provided to identify users and associated information at a service provider location based on facial recognition. In an example embodiment, a user conducts a service request at a service provider device at the service provider system location. The user selects an account data type and provides account data. The service provider device processes a first service request using the provided account data. The service provider device displays a request to associate the account data with a user facial template. If the user consents, the service provider device captures a first image of the user's face using a camera device, generates a first user facial template based on the first user image, and stores the first user facial template. The service provider device transmits the first user facial template with the user payment account information to the service provider system. The service provider system associates the first user facial template with the user account data. At a later time, the user arrives at the service provider device to conduct a subsequent transaction.

If the user consents to service request processing via facial recognition, the service provider device operator selects an option to determine the user account data based on facial recognition. The service provider device captures a second facial image of the user and generates a second user facial template based on the second facial image of the user. The service provider device searches for the stored first facial template matching the generated second facial template. If the service provider device finds a matching first stored facial template, the service provider device transmits the first stored matching facial template to the service provider system and a request for stored user account data. The service provider device receives the stored user account data associated with the stored first facial template from the service provider system. The service provider device processes a subsequent transaction using the received user account data associated with the first user facial template.

In certain other example aspects described herein, systems and computer program products to identify appropriate account information for use in service requests based on facial recognition of users are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 6 is a block flow diagram depicting a method for processing a subsequent payment transaction with payment information determined based on facial recognition of a user, in accordance with certain example embodiments.

DETAILED DESCRIPTION OF EXAMPLE EMBODIMENTS

Overview

Figure 1:
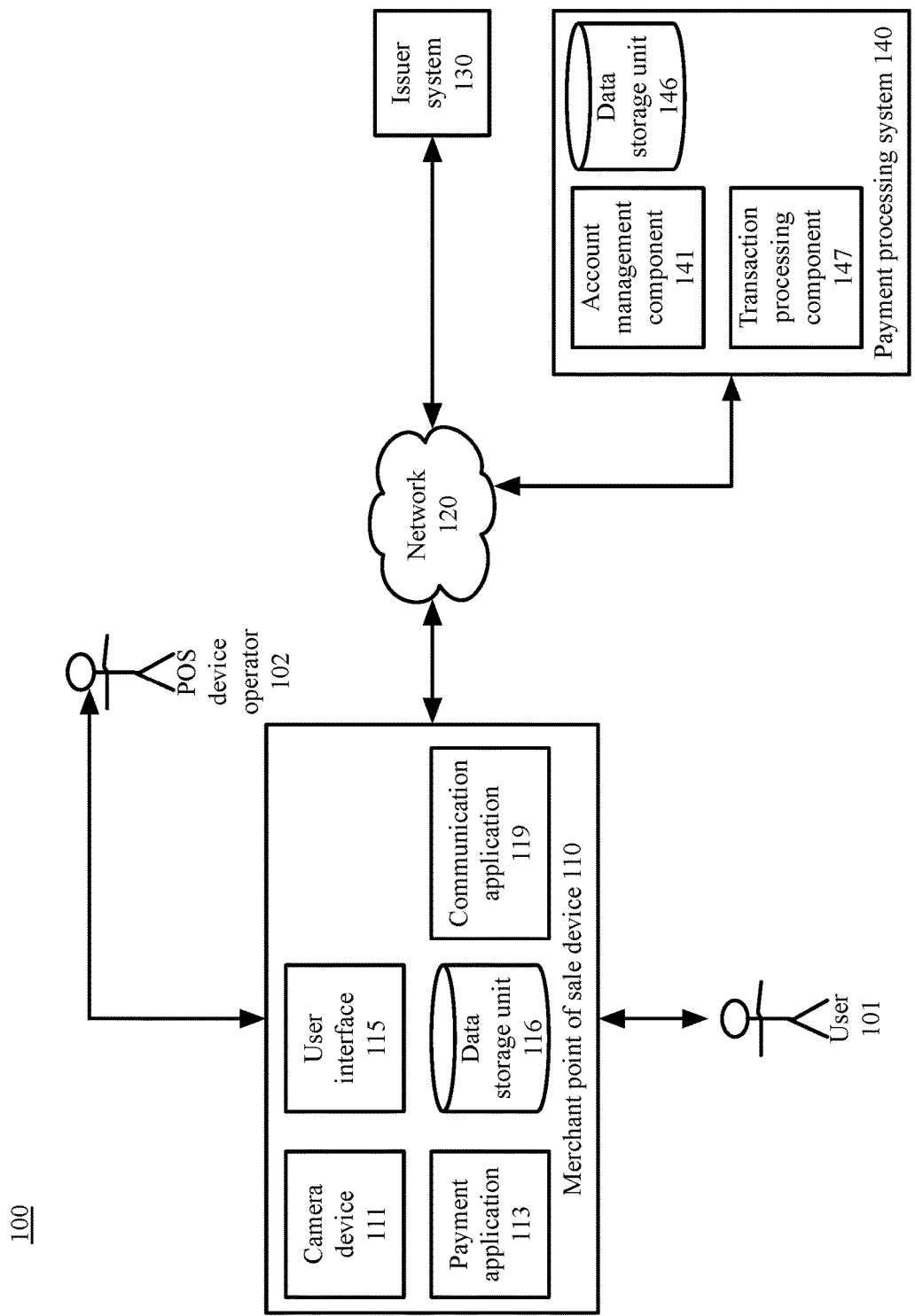
FIG. 1 is a block diagram depicting a system for identifying users and associated payment account information at a merchant system location based on facial recognition, in accordance with certain example embodiments.

The example embodiments described herein provide computer-implemented techniques for identifying users and associated information at a service provider location based on facial recognition.

In an example embodiment, a merchant system registers a merchant point of sale device with a payment processing system. A user conducts a payment transaction at the merchant point of sale device at the merchant system location. For example, the user arrives at the merchant point of sale device. The merchant point of sale device operator totals items of the user for purchase and asks the user to select a payment option. The user selects a payment option and provides payment account information. The merchant point of sale device transmits a payment authorization request to an issuer system associated with the payment account information. The issuer system receives the payment authorization request and approves the payment authorization request. The merchant point of sale device receives a notice of approval of the payment authorization request from the issuer system and transmits a receipt to the user. The merchant point of sale device displays a request to associate the payment account information with a user facial template. If the user consents, the merchant point of sale device operator selects an option to associate the user payment account information with a user facial template. The merchant point of sale device captures a first image of the user's face using a camera device, generates a first user facial template based on the first user image, and stores the first user facial template. The merchant point of sale device deletes the first user image and transmits the first user facial template with the user payment account information to the payment processing system. The payment processing system receives the first user facial template and the user payment account information and associates the first user facial template with the user payment account information. At a later time, the user arrives at the merchant point of sale device to conduct a subsequent transaction. The merchant point of sale device operator totals items of the user for purchase and displays a request for the user to pay using facial recognition. If the user consents to payment via facial recognition, the merchant point of sale device operator selects an option to determine the payment account information based on facial recognition. The merchant point of sale device captures a second facial image of the user and generates a second user facial template based on the second facial image of the user. The merchant point of sale device searches for the stored first facial template matching the generated second facial template. If the merchant point of sale device finds a matching first stored facial template, the merchant point of sale device transmits the first stored matching facial template to the payment processing system and a request for stored payment account information. The merchant point of sale device receives the stored payment account information associated with the stored first facial template from the payment processing system. The merchant point of sale device processes a subsequent transaction using the received payment information associated with the first user facial template.

A merchant system registers with a payment processing system. In an example, a merchant system operator installs a payment application on a merchant point of sale device. In another example, the merchant system operator installs the payment application on each of a plurality of merchant point of sale devices at a merchant system location. In yet another example, the merchant system comprises a plurality of merchant system locations and one or more merchant system operators install the payment application on each of one or more merchant point of sale devices at each of the plurality of merchant system locations. In an example embodiment, the merchant system establishes a merchant system account with the payment processing system. The merchant system may provide payment account information associated with one or more payment accounts associated with the merchant system to associate with the merchant system account.

A user conducts a payment transaction at a merchant point of sale device at a merchant system location. The user arrives at the merchant point of sale device. For example, the user shops at the merchant system location and identifies one or more products and/or services that the user desires to purchase and approaches the merchant point of sale device to purchase the one or more items and/or services. The merchant point of sale device operator totals the items of the user for purchase. The merchant point of sale device operator asks the user to select a payment option. In an example, the merchant point of sale device operator scans or otherwise enters information associated with the one or more items that the user desires to purchase and selects an interface object on the user interface of the merchant point of sale device to cause the merchant point of sale device to total the items for purchase. In this example, the merchant point of sale device operator selects an object on the user interface of the merchant point of sale device to initiate a payment transaction for the one or more items selected for purchase. In this example, the merchant point of sale device, in response to the merchant point of sale device operator selecting the option to initiate the payment transaction, displays a request for a selection of a payment option.

The user selects a payment option and provides payment information. In an example embodiment, the merchant point of sale device displays one or more payment options for selection by the merchant point of sale device operator or for selection by the user. Example payment options comprise payment by credit card, payment by check, payment by debit card, payment by gift card, payment by cash, and/or other applicable payment options accepted at the merchant system location. In an example, the user directs the merchant point of sale device operator to select a payment option desired by the user. For example, the user directs the merchant point of sale device operator to select an option to pay by credit card. In an example, the merchant point of sale device operator selects an object on the user interface of the merchant point of sale device to request payment via the payment option desired by the user. In an example, in response to receiving an input of a selection of a particular payment option, the merchant point of sale device displays a request for payment information associated with the selected payment option. For example, the user directed the merchant point of sale device operator to select a payment option to pay by credit card and the merchant point of sale device displays a request for payment card information. The user may submit payment account information from a payment instrument such as a plastic card by swiping a magnetic stripe of a payment card at a reader of the merchant point of sale device or inserting a chip of a payment card at a chip reader of the merchant point of sale device. In another example, the user directs the merchant point of sale device operator to enter a payment account identifier as an input to the merchant point of sale device. In yet another example, the user may otherwise submit payment account information for the selected payment option. In an example, the merchant point of sale device receives the payment account information input by the merchant point of sale device operator and/or input by the user. Payment account information may comprise one or more of a payment account identifier comprising alphanumeric and/or symbolic characters, an expiration date, a zip code associated with the payment account, a card verification code or other security code, a personal identification number ("PIN"), an address associated with the payment account, a name associated with an account holder of the payment account, and/or biometric information provided by the user.

The merchant point of sale device transmits a payment authorization request to an issuer system associated with the payment account information. In another example, the merchant point of sale device communicates information associated with the transaction to a payment processing system and the payment processing system transmits the payment authorization request to the issuer system via the network. In an example, the issuer system is associated with the user payment account selected for use in the transaction. For example, the issuer system receives the payment authorization request from the merchant point of sale device or from the payment processing system over a network. The issuer system approves the payment authorization request and transmits a payment authorization approval to merchant point of sale device over the network. In another example, the issuer system transmits the payment authorization approval to the payment processing system over the network and the payment processing system forwards the payment authorization approval to the merchant point of sale device over the network. The merchant point of sale device transmits a receipt to the user. In another example, the payment processing system receives the payment authorization approval over the network and transmits a transaction receipt to the merchant point of sale device over the network or transmits the transaction receipt directly to the user. For example, transmitting the receipt to the user comprises sending an email to an email account of the user, printing a physical receipt via the merchant point of sale device for the merchant point of sale device operator to hand to the user, or otherwise transmitting the receipt to the user.

The merchant point of sale device displays a request to associate the payment information from the completed transaction with a user facial template. In an example, the merchant point of sale device displays the request to associate the payment information with a user facial template and provides, via a user interface, an option to consent to associating the payment information with a user facial template and an option to decline associating the payment information with a user facial template. If the user expresses a desire to decline associating the payment information from the completed transaction with a user facial template, the merchant point of sale device operator selects the option not to associate the payment information with a user facial template. In an example, in response to receiving an input indicating that the user does not wish to associate the payment information with a user facial template, the merchant point of sale device displays a message indicating that the payment transaction is completed. For example, the merchant point of sale device displays a message reading "Thank you for shopping at Merchant A location!"

If the user expresses a desire to consent to associating the payment information from the completed transaction with a user facial template, the merchant point of sale device operator selects the option to associate the payment information with a user facial template. The merchant point of sale device captures a facial image of the user using a camera device. In an example, the merchant point of sale device captures the facial image of the user in response to receiving the input of the selection of the option to associate the payment information with a user facial template. In an example, the merchant point of sale device comprises the camera device. In another example, the camera device is communicatively coupled to the merchant point of sale device. The merchant point of sale device generates a user facial template based on the user facial image and stores the user facial template. In an example, the user facial template comprises a computer code representation of the user facial image. The merchant point of sale device deletes the user facial image. The merchant point of sale device transmits the user facial template and the user payment account information used in the completed transaction to the payment processing system. The payment processing system receives the user facial template and the user payment account information and associates the user facial template with the user payment account information. In an example, the payment processing system stores the user facial template and user payment account information in a memory of the payment processing system.

The user conducts a subsequent payment transaction at the merchant location with facial recognition. For example, the user arrives at the merchant point of sale device. In an example embodiment, the merchant point of sale device comprises the same merchant point of sale device at which the user conducted the completed transaction in which the user associated payment account information with the facial template of the user. In another example embodiment, the merchant point of sale device comprises a different merchant point of sale device at the same merchant system location at which the user conducted the completed transaction in which the user associated payment account information with the facial template of the user. In yet another example embodiment, the merchant point of sale device comprises a different merchant point of sale device than the merchant point of sale device at which the user previously associated the payment account information and the user facial template and the different merchant point of sale device is located at a different merchant system location than the merchant system location at which the user associated the payment account information and the user facial template.

The merchant point of sale device operator totals one or more items of the user for purchase and the merchant point of sale device displays a request for the user to pay via facial recognition. In an example, the merchant point of sale device displays an option to pay via facial recognition and an option to decline payment via facial recognition. If the user indicates a desire to decline payment via facial recognition, the merchant point of sale device operator selects the option to decline payment via facial recognition and the merchant point of sale device displays a request for payment information. The user selects a payment option, for example, payment via credit account, bank account, or store account, and provides payment information associated with the selected payment option. The merchant point of sale device processes a transaction.

If the user indicates a desire to consent to payment via facial recognition, the merchant point of sale device determines payment information based on facial recognition of the user. The merchant point of sale device captures a facial image of the user. For example, the merchant point of sale device captures a facial image of the user using the camera device. In an example, the merchant point of sale device captures the facial image of the user in response to receiving the input of the selection of the option to consent to payment via facial recognition. The merchant point of sale device generates a user facial template based on the user facial image and stores the user facial template. In an example, the user facial template comprises a computer code representation of the user facial image. In an example, the merchant point of sale device deletes the user facial image. The merchant point of sale device searches for a stored user facial template matching the generated user facial template.

In an example embodiment, searching for a stored user facial template comprises searching on a memory of the merchant point of sale device, on a memory of one or more merchant point of sale devices communicatively coupled to the merchant point of sale device, on a memory of the payment processing system, or searching on any other appropriate memory of a computing device communicatively coupled to or otherwise accessible to the merchant point of sale device for storing user facial templates. In an example embodiment, searching for a matching stored user facial template comprises comparing one or more regions of the generated user facial template to one or more corresponding regions of each of the stored user facial templates.

If the merchant point of sale device is unable to find a stored user facial template matching the generated user facial template, the merchant point of sale device operator asks the user to select a payment option and the user selects a payment option and provides payment information. In this example, the merchant point of sale device processes a payment transaction using the payment information provided by the user. For example, the merchant point of sale device transmits a payment authorization request to an issuer system associated with the payment information provided by the user. In this example, the issuer system receives the payment authorization request and approves or denies the payment authorization request. The merchant point of sale device receives a notice of an approved or denied payment authorization request and transmits a receipt to the user in accordance with the notice of approved or denied payment authorization request received from the issuer system.

If the merchant point of sale device finds a stored user facial template matching the generated facial template, the merchant point of sale device transmits a request for stored payment information associated with the generated user facial template to the payment processing system. In an example, the payment processing system receives the generated user facial template and finds a matching stored user facial template that matches the received user facial template. For example, the payment processing system compares one or more regions of the received user facial template to one or more corresponding regions of user facial templates stored on a memory of the payment processing system. The payment processing system finds a matching stored user facial template that matches the received user facial template and extracts stored payment information associated with the matching stored user facial template. The payment processing system transmits the extracted payment information to the merchant point of sale device, which receives the payment information over the network. The merchant point of sale device transmits a payment authorization request to the issuer system associated with the received payment information. In another example, the payment processing system request transaction details from the merchant point of sale device, receives the transaction details from the merchant point of sale device, generates a payment authorization request based on the transaction details and the extracted payment information, and transmits the payment authorization request to the issuer system.

The issuer system receives the payment authorization request and approves the payment authorization request. The issuer system transmits a notice of approved payment authorization request to the merchant point of sale device. In another example, the issuer system transmits a notice of approved payment authorization request to the payment processing system and the payment processing system transmits the notice of approved payment authorization request to the merchant point of sale device. The merchant point of sale device transmits a receipt to the user. In another example, the payment processing system receives the payment authorization approval over the network and transmits a transaction receipt to the merchant point of sale device over the network or transmits the transaction receipt directly to the user. For example, transmitting the receipt to the user comprises sending an email to an email account of the user, printing a physical receipt via the merchant point of sale device for the merchant point of sale device operator to hand to the user, or otherwise transmitting the receipt to the user.

By using and relying on the methods and systems described herein, the service provider processing server, the service provider system computing device, and the issuer system enable the user to conduct a transaction without the user having to interact with a mobile device at a service provider system location, as required in some current technology. As such, the systems and methods described herein may reduce the inputs required by the user and the inputs required by the service provider system computing device operator to identify the user.

Example System Architecture

Turning now to the drawings, in which like numerals indicate like (but not necessarily identical) elements throughout the figures, example embodiments are described in detail.

FIG. 1 is a block diagram depicting a system 100 for identifying users and associated payment account information at a merchant system location based on facial recognition, in accordance with certain example embodiments. As depicted in FIG. 1, the system 100 includes network computing devices 110, 130, and 140 that are configured to communicate with one another via one or more networks 120. In some embodiments, a user associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, and 140 are operated by merchant point of sale ("POS") device 110 operators, issuer system 130 operators, and payment processing system 140 operators, respectively.

An example merchant point of sale ("POS") device 110, or service provider device, comprises a camera device 111, payment application 113, a user interface 115, a data storage unit 116, and a communication application 119.

In an example embodiment, the camera device 111 the camera device 111 may be any component, application, or function of the merchant POS device 110 that captures a video input or captures a digital image of an external environment of the merchant camera device 111. In another example embodiment, the camera device 111 is separate from the merchant POS device 110 but communicatively coupled to the merchant POS device 110. For example, the camera device 111 may be connected to the merchant POS device 110 via the network 120. In an example, the camera device 111 comprises a lens and an application that processes an input of an environment captured by the lens to produce an image. The camera device 111 may be capable of obtaining individual images or a video scan. Any other suitable image-capturing device may be represented by the camera device 111.

In an example embodiment, the payment application 113 is a program, function, routine, applet, or similar entity that exists on and performs its operations on the merchant point of sale device 110. In certain example embodiments, the merchant POS device operator 102 or other merchant system operator must install the payment application 113 and/or make a feature selection on the merchant POS device 110 to obtain the benefits of the techniques described herein. In an example embodiment, the merchant POS device operator 102 may access the payment application 113 on the merchant POS device 110 via the user interface 115. In an example embodiment, the payment application 113 may be associated with the payment processing system 140.

In an example embodiment, the user interface 115 enables the merchant POS device operator 102 to interact with the merchant POS device 110. For example, the user interface 115 may be a touch screen, a voice-based interface, or any other interface that allows the merchant POS device operator 102 to provide input and receive output from an application on the merchant POS device 110. In an example embodiment, the merchant POS device operator 102 interacts via the user interface 115 with the payment application 113.

In an example embodiment, the data storage unit 116 comprises a local or remote data storage structure accessible to the merchant POS device 110 suitable for storing information. In an example embodiment, the data storage unit 116 stores encrypted information, such as HTML5 local storage.

In an example embodiment, the communication application 119, such as a web browser application or a stand-alone application, enables an operator of the merchant POS device 110 to view, download, upload, or otherwise access documents or web pages via a distributed network 120. For example, the communication application 119 may enable communication over the network 120 with the payment processing system 140.

An example issuer system 130 approves or denies a payment authorization request received from the merchant POS device 110 or from the payment processing system 140. In an example embodiment, the issuer system 130 communicates with the merchant POS device 110 and/or payment processing system 140 over the network 120. In an example embodiment, the issuer system 130 communicates with an acquirer system to approve a credit authorization and to make payment to the payment processing system 140 and/or merchant system. For example, the acquirer system is a third party payment processing company.

An example payment processing system 140, or service provider system, comprises an account management component 141, a data storage unit 146, and a transaction processing component 147.

In an example embodiment, the account management component 141 receives a user 101 facial template and payment account information used in a previous transaction from the merchant POS device 120 and associates the received user 101 facial template with the received payment account information. In an example, the account management component 141 stores the user 101 facial template and associated payment account information in a data storage unit 146 of the payment processing system 140. In an example embodiment, the account management component 141 receives a user 101 facial template from the merchant POS device 110 and finds a matching stored user 101 facial template that matches the received user 101 facial template. In this example embodiment, the account management component 141 extracts stored payment information associated with the matching stored user 101 facial template. In an example, the account management component 141 transmits the extracted payment information associated with the matching user 101 facial template to the merchant POS device 110. In another example, the account management component 141 transmits the extracted payment information associated with the matching user 101 facial template to the transaction processing component 147.

In an example embodiment, the data storage unit 146 comprises a local or remote data storage structure accessible to the payment processing system 140 suitable for storing information. In an example embodiment, the data storage unit 166 stores encrypted information, such as HTML5 local storage.

In an example embodiment, the transaction processing component 147 receives transaction details from a merchant POS device 130 and payment information associated with a user 101 facial template from the account management component 141. Example transaction details comprise merchant system account information and a total amount of the transaction. In an example embodiment, the transaction processing component 147 transmits a payment authorization request to an issuer system 130 or other appropriate financial institution associated with the payment account information associated with the user 101 facial template. An example payment authorization request may comprise merchant system payment account information, user 101 payment account information, and a total amount of the transaction. In an example embodiment, after the issuer system 130 processes the payment authorization request, the transaction processing component 147 receives an approval or denial of the payment authorization request from the issuer system 130 over the network 120. In an example embodiment, the transaction processing component 147 transmits a receipt to the merchant POS device 110 comprising a summary of the payment transaction.

Figure 7:
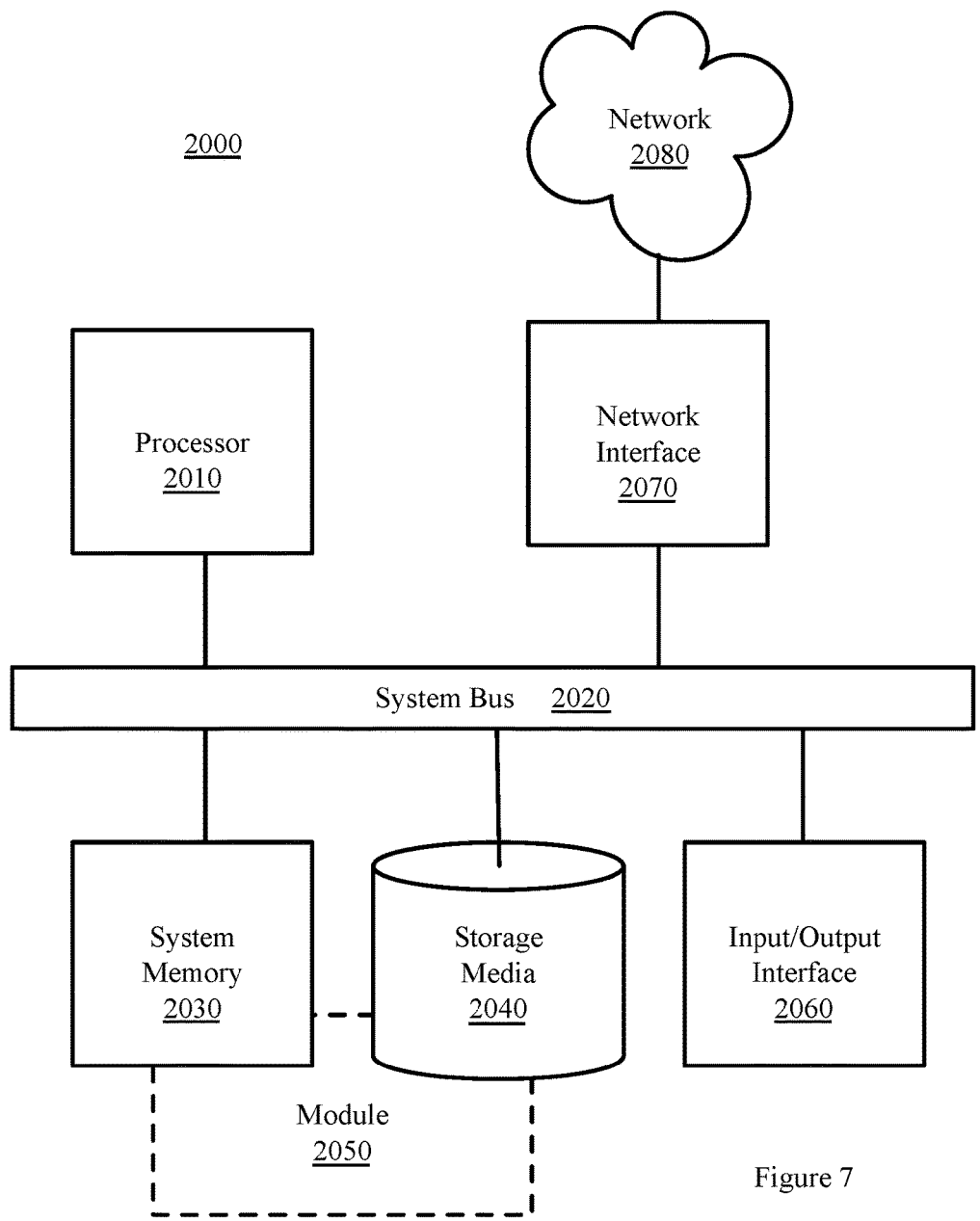
FIG. 7 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 7. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 7. The computing machines discussed herein may communicate with one another, as well as with other computing machines or communication systems over one or more networks, such as network 120. The network 120 may include any type of data or communications network, including any of the network technology discussed with respect to FIG. 7.

In example embodiments, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 120. The network 120 may include any type of data or communications network, including any of the network technology discussed with respect to FIG. 7.

Example Processes

The example methods illustrated in FIGS. 2-6 are described hereinafter with respect to the components of the example operating environment 100. The example methods of FIGS. 2-6 may also be performed with other systems and in other environments. The operations described with respect to any of the FIGS. 2-6 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
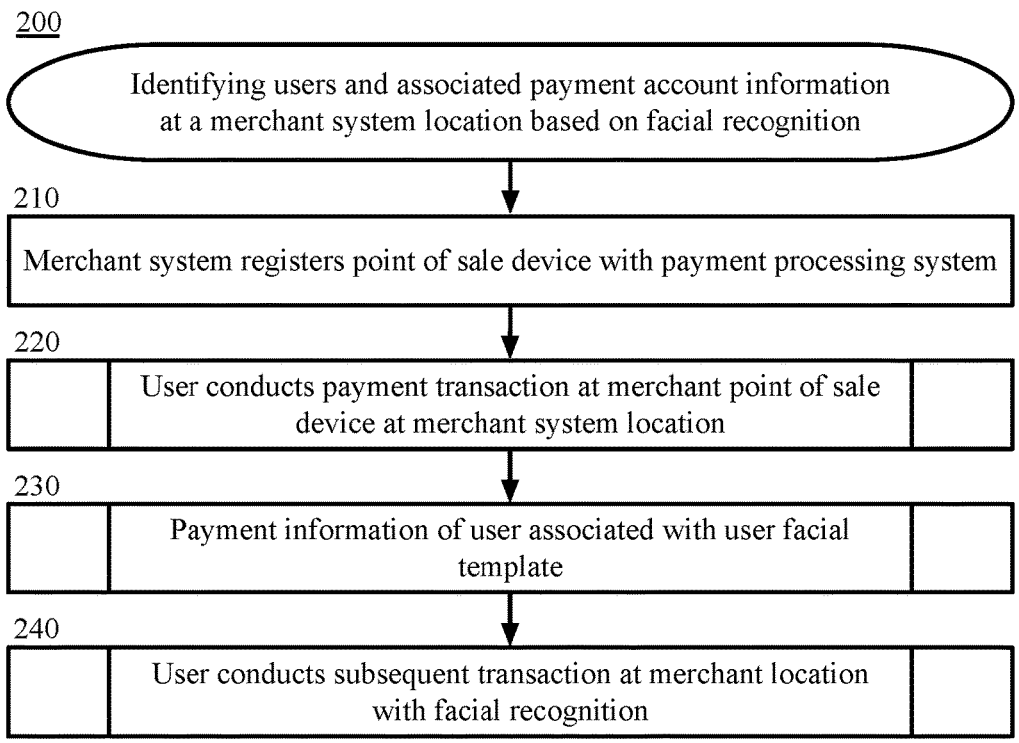
FIG. 2 is a block flow diagram depicting a method for identifying users and associated payment account information at a merchant system location based on facial recognition, in accordance with certain example embodiments.

FIG. 2 is a block diagram depicting a method 200 for identifying users 101 and associated payment account information at a merchant system location based on facial recognition, in accordance with certain example embodiments. The method 200 is described with reference to the components illustrated in FIG. 1.

In block 210, the merchant system registers with the payment processing system 140. In an example embodiment, an agent of the merchant system registers for a merchant account with the payment processing system 140 via a website of the payment processing system 140. In an example embodiment, the merchant system adds payment account information to the merchant account managed by the payment processing system 140. In an example embodiment, the merchant system comprises one or more merchant system locations. For example, the merchant system may comprise one or more physical store locations. An example merchant location comprises one or more merchant point of sale ("POS") devices 110. In an example embodiment, one or more merchant POS device operators 102 operate the one or more merchant POS devices 130 at each of the one or more merchant system locations.

In an example embodiment, a merchant system POS device operator 102 installs the payment application 113 on the merchant POS device 110. In another example embodiment, the merchant system POS device operator 102 purchases a merchant POS device 110 from the payment processing system 140 or otherwise obtains the merchant POS device 110 with the payment application 113 pre-installed on the merchant POS device 110. In an example embodiment, the merchant POS device 110 is able to communicate with the payment processing system 140, one or more issuer systems 130, and one or more acquirer systems over a network 120. In an example embodiment, the merchant POS device 110 communicates with the payment processing system 140 via the payment application 113 over the network 120. In certain example embodiments, the merchant POS device 110 may be able to transmit transaction details to the payment processing system 140 via the payment application 113 over the network 120 to enable the payment processing system 140 to process a transaction. In an example embodiment, the merchant POS device 110 receives a receipt from the payment processing system 140 that notifies a merchant POS device operator 102 as to whether a transaction was successful or not. In an example embodiment, the merchant system installs the merchant POS device 110 in an appropriate location at the merchant system location, for example, in a checkout area of the merchant location.

In block 220, the user 101 conducts a payment transaction at a merchant POS device 110 at a merchant system location. The method for conducting a payment transaction at a merchant point of sale device 110 at a merchant system location is described in more detail hereinafter with reference to the method described in FIG. 3.

Figure 3:
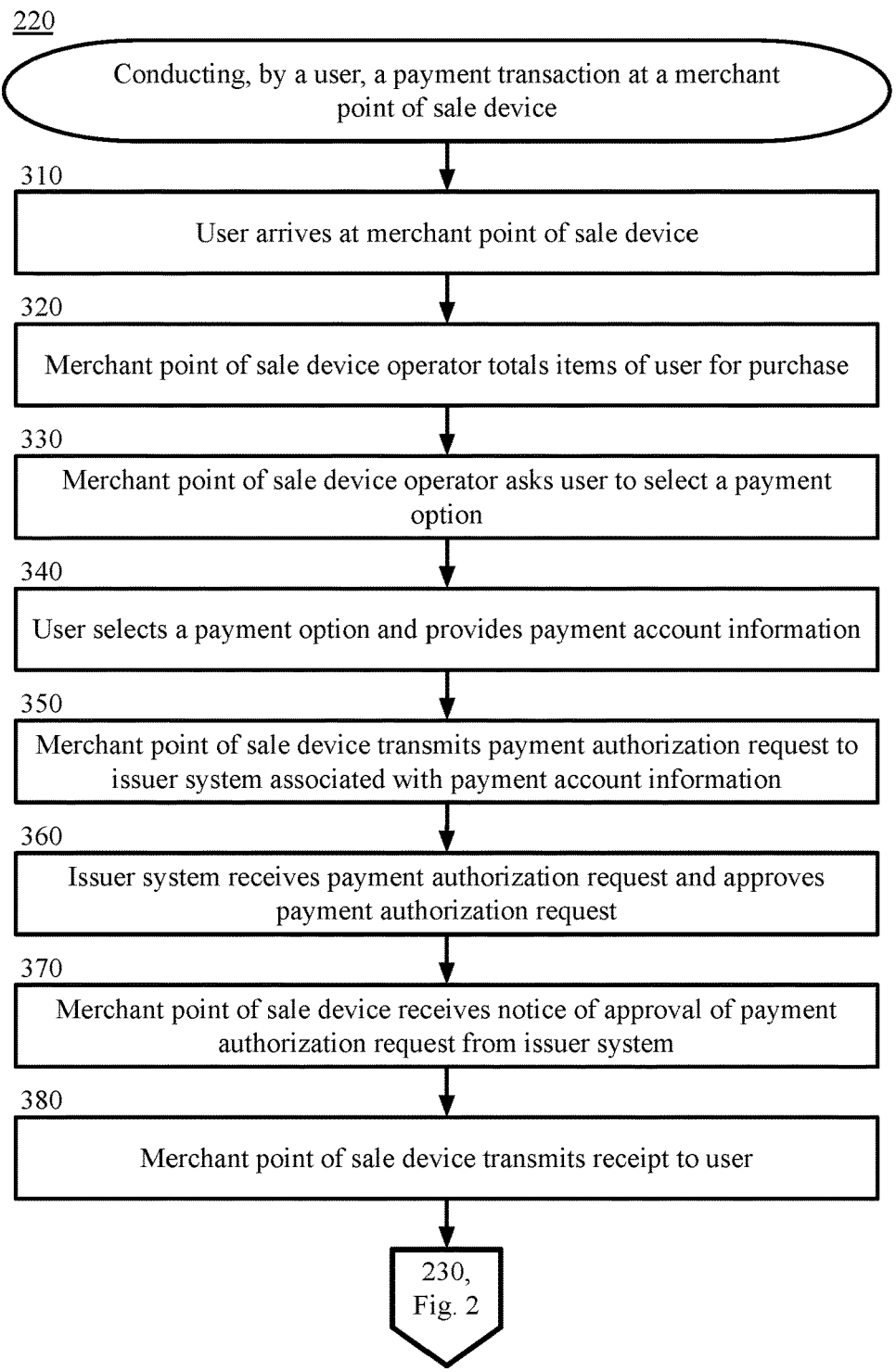
FIG. 3 is a block flow diagram depicting a method for conducting, by a user, a payment transaction at a merchant point of sale device, in accordance with certain example embodiments.

FIG. 3 is a block diagram depicting a method 220 for conducting, by a user 101, a payment transaction at a merchant point of sale device 110, in accordance with certain example embodiments. The method 220 is described with reference to the components illustrated in FIG. 1.

In block 310, the user 101 arrives at the merchant POS device 110. In an example embodiment, the user 101 shops at the merchant location, selects one or more items and/or services for purchase and presents the items and/or services to the merchant POS device operator 102 for purchase at a checkout area of the merchant location.

In bock 320, the merchant POS device operator 102 totals items of the user 101 for purchase. For example, the merchant POS device operator 102 scans barcodes or other machine-readable identifiers attached to the items via the merchant POS device 110 or otherwise inputs information associated with the items into the merchant POS device 110. In an example embodiment, the merchant POS device 110 displays a total amount for the transaction. In this example embodiment, the merchant POS device 110 may display information associated with each item such as a price, description of the item, and a quantity of the item.

In block 330, the merchant POS device operator 102 asks the user 101 to select a payment option. In an example embodiment, the merchant POS device 110 displays, via a user interface 115 of the merchant POS device 110, one or more objects on the user interface 115 corresponding to one or more forms of payment accepted at the merchant location. A payment option may comprise payment by cash, payment by credit card, payment by bank account, payment by store account, payment by check, or any other form of payment accepted by the merchant system for purchase transactions at the merchant location.

In block 340, the user 101 selects a payment option and provides payment account information. For example, the user 101 selects a payment option to pay via credit card and provides the credit card or otherwise provides payment account information associated with the credit account to the merchant POS device operator 102. In an example embodiment, the merchant POS device 110 operator may swipe a payment card, for example a credit card, debit card, gift card, store card, or other payment card, at a card reader of the merchant POS device 110 to transmit payment account information from the payment card to the merchant POS device 110. For example, the payment card may comprise a magnetic stripe or chip that is read by a card reader of the merchant POS device 110. In another example embodiment, the merchant POS device 110 operator may scan a check provided by the user 101 or otherwise enter account information associated with a bank account of the user into the merchant POS device 110.

In block 350, the merchant POS device 110 transmits a payment authorization request to an issuer system 130 associated with the payment account information. In an example embodiment, the merchant POS device 110 generates a payment authorization request comprising the user 101 payment account information provided by the user, merchant system payment account information, and a total amount of the transaction. In an example embodiment, the issuer system 130 receives the payment authorization request from the merchant POS device 110 via the network 120.

In another example embodiment, the merchant POS device 110 transmits transaction details to the payment processing system 140 and the payment processing system 140 generates the payment authorization request and transmits the payment authorization request to the issuer system 130. For example, the merchant POS device 110 transmits transaction details to the payment processing system 140 comprising a transaction total, an account identifier of the merchant system, and the payment account information provided by the user 101. In this example embodiment, the payment processing system 140 receives the transaction details over the network 120. In this example embodiment, the payment processing system 140 transmits a payment authorization request to the issuer system 130. In this example embodiment, the payment processing system 140 generates a payment authorization request comprising user 101 payment account information, merchant system payment account information, and a total amount of the transaction. In an example embodiment, the issuer system 130 receives the payment authorization request from the payment processing system 140 via the network 120.

In block 360, the issuer system 130 receives the payment authorization request and approves the payment authorization request. In an example embodiment, the issuer system 130 receives the payment authorization request from the payment processing system 140 or from the merchant POS device 110 via the network 120. In an example embodiment, the issuer system 130 approves the payment authorization request and transmits a payment authorization approval notice to the payment processing system 140 or to the merchant POS device 110. In an example embodiment, the issuer system 130 subtracts the user's 101 current account balance from the user's 101 credit limit associated with the user's 101 payment account. In this example, if the different between the credit limit and the credit balance is a positive number greater than the total amount of the transaction, the issuer system 130 approves the payment authorization. For example, the user 101 will not exceed his credit limit if the transaction were to be approved, therefore the issuer system 130 approves the payment authorization request. In an example embodiment, the payment processing system 140 or the merchant POS device 110 receives the payment authorization approval from the issuer system 130. In another example embodiment, the payment processing system 140 or merchant POS device 110 receives a denial of the payment authorization request in response to the issuer system 130 declining the payment authorization request. In an example embodiment, if the issuer system 130 approves the payment authorization request, the issuer system 130 credits the merchant system account and adds a charge to the user 101 credit account, bank account or other payment account used by the user 101 in the transaction.

In block 370, the merchant POS device 110 receives a notice of approval of the payment authorization request from the issuer system 130. For example, the issuer system 130 generates the notice of approval of the payment authorization request and transmits the notice of approval of payment authorization request to the merchant POS device 110 via the network 120. In another example, the payment processing system 140 transmits the notice of approval of payment authorization request to the payment processing system 140 via the network 120 and the payment processing system 140 transmits the notice to the merchant POS device 110 via the network 120.

In block 380, the merchant POS device 110 transmits a receipt to the user 101. For example, the merchant POS device 110 transmits the receipt to a user computing device associated with the user 101 for display on the user computing device. In another example, the merchant POS device 110 prints a receipt comprising a summary of the transaction via a printer device that is a component of or otherwise communicatively coupled to the merchant POS device 110.

From block 380, the method 220 proceeds to block 230 in FIG. 2.

Returning to FIG. 2, in block 230, the payment information of the user 101 is associated with a user 101 facial template. The method for associating payment account information of a user 101 with a user 101 facial template is described in more detail hereinafter with reference to the method described in FIG. 4.

Figure 4:
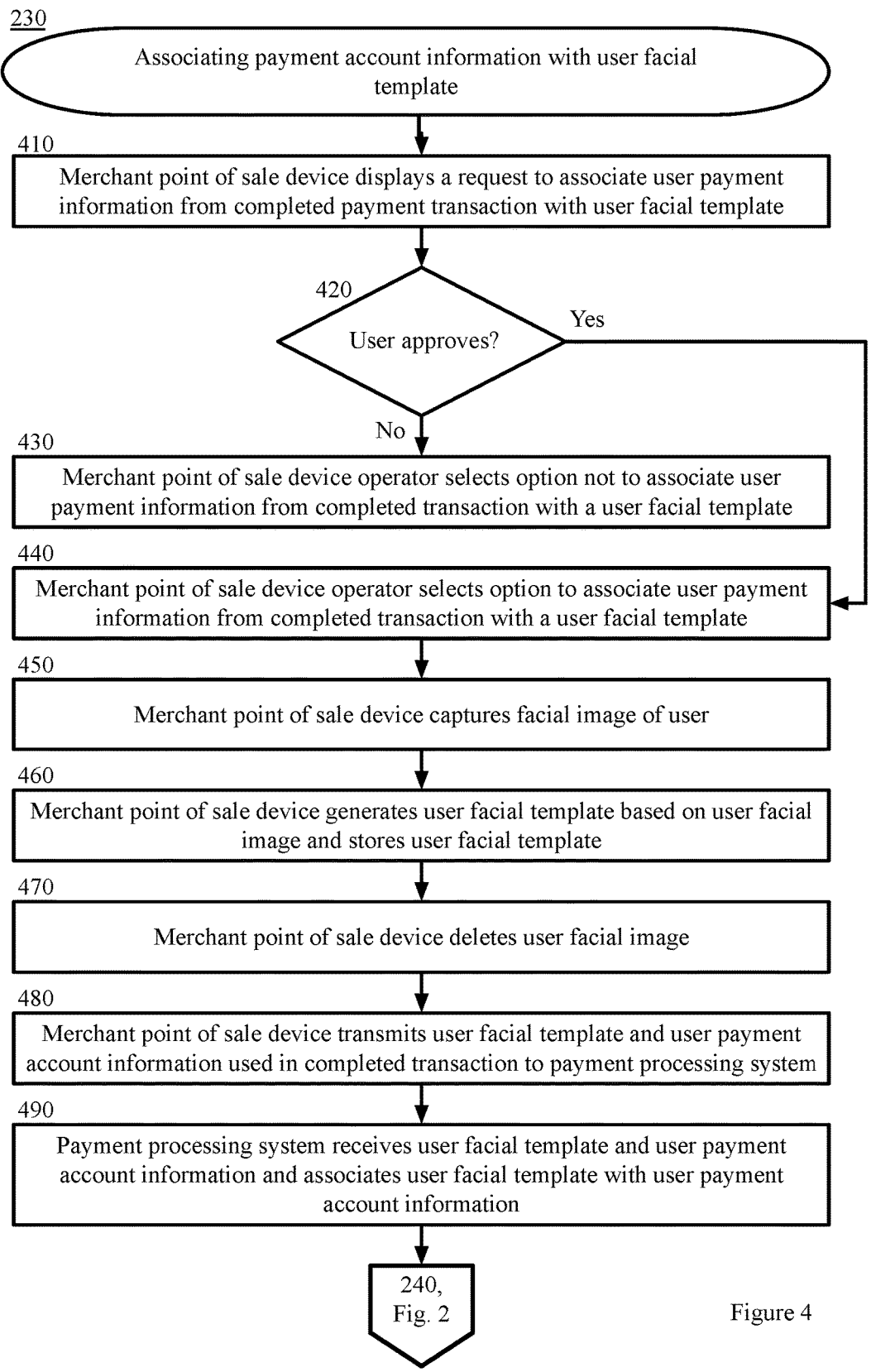
FIG. 4 is a block flow diagram depicting a method for associating payment account information of a user with a user facial template, in accordance with certain example embodiments.
Figure 5:
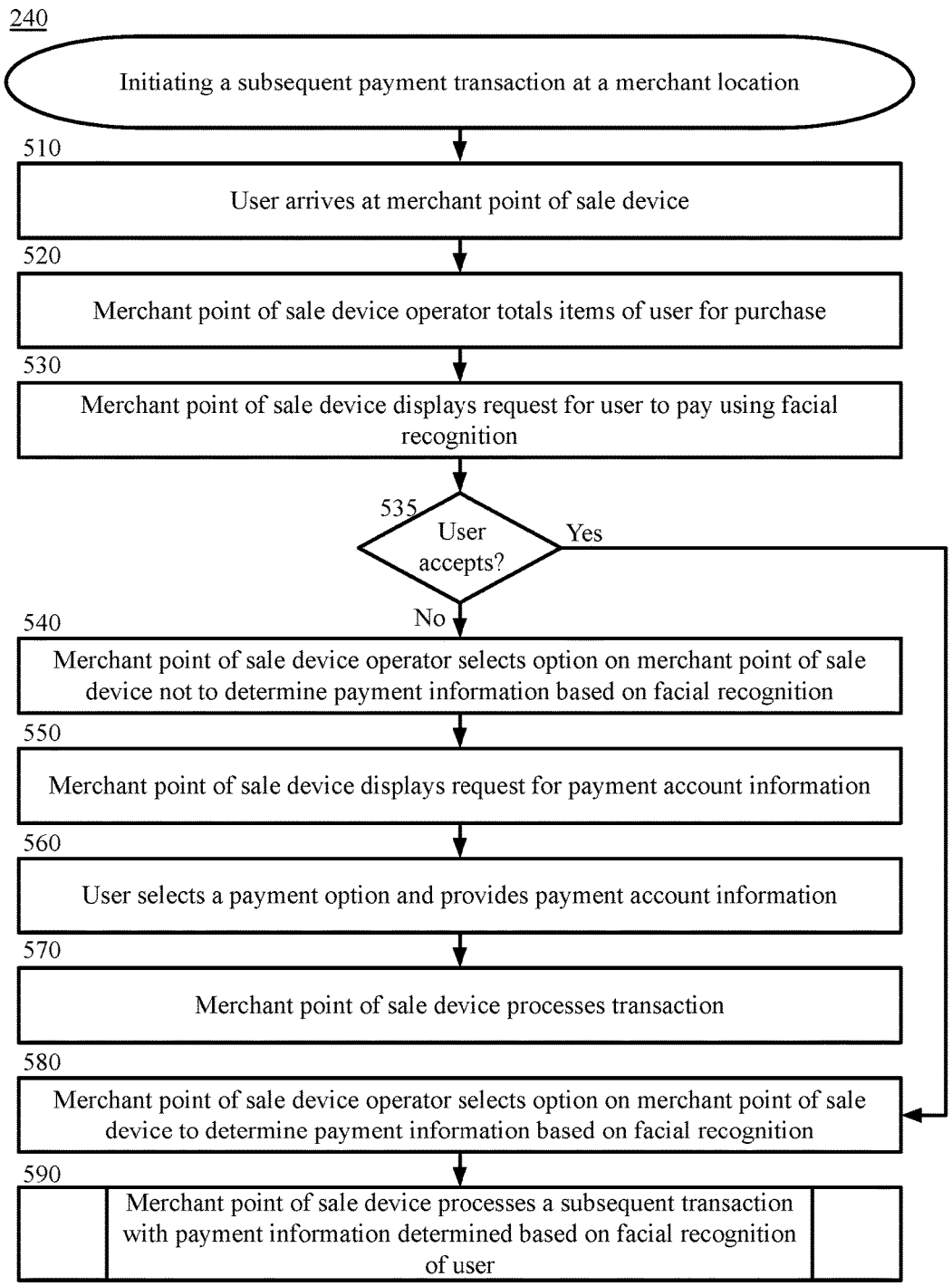
FIG. 5 is a block flow diagram depicting a method for initiating, by a user, a subsequent payment transaction at a merchant location, in accordance with certain example embodiments.

FIG. 4 is a block diagram depicting a method 230 for associating payment account information of a user 101 with a user 101 facial template, in accordance with certain example embodiments. The method 230 is described with reference to the components illustrated in FIG. 1.

In block 410, the merchant POS device 110 displays a request to associate user 101 payment information from the completed payment transaction with a user 101 facial template. For example, the merchant POS device 110 displays a request, via the user interface 115, that reads "would you like to sign up for payments with facial recognition?" In an example, the user 101 may ask the merchant POS device operator 102 for information about the process for associating user 101 payment information from the completed payment transaction with a user 101 facial template.

In block 420, the user 101 decides whether to approve or decline the request to associate the user 101 payment information from the completed transaction with a user 101 facial template.

If the user declines the request to associate the user 101 payment information from the completed transaction with a user 101 facial template, the method 230 proceeds to block 430.

In block 430, the merchant POS device operator 102 selects an option not to associate the user 101 payment information from the completed transaction with a user 101 facial template. For example, the user 101 directs the merchant POS device operator 102 to select, via the user interface 115 of the merchant POS device 110, an option to decline the request to associate user 101 payment information from the completed payment transaction with a user 101 facial template. In this example, the merchant POS device operator 102, selects the option to decline the request in accordance with the decision of the user 101 by selecting an object on the user interface 115 of the merchant POS Device 110. In an example embodiment, if the merchant POS device operator 102 selects the option not to associate the user 101 payment account information from the completed transaction with a user 101 facial template, the merchant POS device 110 deletes the user 101 payment information. For example, in response to receiving an input of a selection of the option not to associate the user 101 payment account information with a user 101 facial template, the merchant POS device 110 deletes the payment account information associated with the completed transaction or otherwise does not save the payment account information or transmit the payment account information to the payment processing system 140 for association with a user 101 facial template.

Returning to block 420, if the user approves the request to associate the user 101 payment information from the completed transaction with a user 101 facial template, the method 230 proceeds to block 440. In an example embodiment, the merchant POS device operator 102 instructs the user 101 position the user's 101 face such that a camera device 111 of the merchant POS device 110 or a camera device 111 otherwise communicatively coupled to the merchant POS device 110 may capture a facial image of the user 101. In this example embodiment, the user 101 positions himself so that the camera device 111 may capture a facial image of the user 101 in response to a selection by the merchant POS device operator 102 of a user interface 115 object.

In block 440, the merchant POS device operator 102 selects an option to associate the user 101 payment information from the completed transaction with a user 101 facial template. For example, the user 101 directs the merchant POS device operator 102 to select, via the user interface 115 of the merchant POS device 110, an option to accept the request to associate user 101 payment information from the completed payment transaction with a user 101 facial template. In this example, the merchant POS device operator 102 selects the option to accept the request in accordance with the decision of the user 101 by selecting an object on the user interface 115 of the merchant POS Device 110. In an example embodiment, if the merchant POS device operator 102 selects the option to associate the user 101 payment account information from the completed transaction with a user 101 facial template, the merchant POS device 110 deletes the user 101 payment information.

In block 450, the merchant POS device 110 captures a facial image of the user 101. For example, in response to receiving an input of a selection of the option to associate the user 101 payment account information with a user 101 facial template, the merchant POS device 110 activates a camera device 111 of the merchant POS device 110 or activates a camera device 111 communicatively coupled to the merchant POS device 110. In an example embodiment, in response to receiving an input of a selection of the option to associate the user 101 payment account information with a user 101 facial template, the merchant POS device 110 instructs the camera device 111 to capture an image of an environment of the camera device 110.

In an example embodiment, in response to receiving the input of the selection of the option to associate the user 101 payment account information with a user 101 facial template, the merchant POS device 110 begins to capture photo images and/or a video of the surroundings of the camera device 111 via the camera device 111. In an example embodiment, the merchant POS device 110 captures a video feed of the user's 101 face via the camera device 111. In another example embodiment, the merchant camera device 1110 continuously captures, but does not record, a video feed of its surroundings via the camera device 111. In this example embodiment, in response to receiving the input of the selection of the option to associate the user 101 payment account information with a user 101 facial template, the merchant POS device 110, via the camera device 111, begins to record the video feed for a threshold amount of time. In an example embodiment, the user 101 may be moving during the period in which the camera device 111 records the video feed. In an example embodiment, a processor of the camera device 111 extracts a facial image by determining a particular frame of the video feed and area of the instance of the video feed corresponding to the face of the user 101. In an example embodiment, the camera device 111 extracts a facial image of the user 101 from the captured video. In an example embodiment, the camera device 111 determines a frame of the captured video to provide an image of the user's 101 face and extracts the frame of the captured video comprising the facial image of the user 101.

In block 460, the merchant POS device 110 generates a user 101 facial template based on the user 101 facial image and stores the user 101 facial template. In an example, the facial template is of a predetermined size, for example, a 128-byte facial template. In an example, the merchant POS device 110 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example, the facial template may describe key features of the facial image of the user 101, such as shape, color, line, value, space, form, texture, or other useful or relevant feature of the image or of particular regions of the image. In an example embodiment, the merchant POS device 110 stores the generated facial template in a data storage unit 116 associated with the merchant POS device 110. For example, the merchant POS device 110 database may comprise a log of facial templates. In an example embodiment, the merchant POS device 110 assigns a facial template identifier to the user 101 facial template and associates the facial template identifier with the stored user 101 facial template. In an example embodiment, the merchant POS device 110 stores the generated user 101 facial template in a memory or data storage unit accessible both by the merchant POS device 110 and by one or more other merchant POS devices 110 at the merchant system location. In another example embodiment, the merchant POS device 110 stores the generated user 101 facial template in a memory or data storage unit accessible by the merchant POS device 110, by one or more other merchant POS devices 110 at the merchant system location at which the completed transaction was conducted, and/or by one or more merchant POS devices 110 at one or more other merchant system locations other than the merchant system location at which the completed transaction was conducted. For example, the memory or data storage device may be a data storage unit 116 on or communicatively coupled to the merchant POS device 110 or may be a memory or data storage accessible via the network 120. In an example embodiment, the merchant POS device 110 stores the payment account information from the completed transaction and associates the stored payment account information with the stored facial template. For example, the merchant POS device 110 stores the user 101 facial template and the associated user 101 payment account information from the completed transaction in a memory or data storage unit accessible by the merchant POS device 110, by one or more other merchant POS devices 110 at the merchant system location at which the completed transaction was conducted, and/or by one or more merchant POS devices 110 at one or more other merchant system locations other than the merchant system location at which the completed transaction was conducted. In another example embodiment, the merchant POS device 110 does not store the payment account information from the completed transaction.

In block 470, the merchant POS device 110 deletes the user 101 facial image. For example, the merchant POS device 110 and/or the camera device 111 deletes the captured video and the extracted facial image. For example, the merchant POS device 110 and the camera device 111 do not store captured images or video. In this example, facial templates generated by the merchant POS device 110 comprise computer code representations of facial images of users 101. In this example, after generating a facial template or after a threshold time has passed after capturing video or images or extracting an image from a video, the merchant POS device 110 and/or the camera device 111 deletes any captured or extracted video or images.

In block 480, the merchant POS device 110 transmits the user 101 facial template and the user 101 payment account information used in the completed transaction to the payment processing system 140. As previously discussed, in some example embodiments, the merchant POS device 110 does not store the payment account information from the completed transaction. In an example embodiment, the merchant POS device 110 transmits the user 101 facial template, a facial template identifier associated with the user 101 facial template generated by the merchant POS device 110, and the user 101 payment account information used in the completed transaction to the payment processing system via the network 120.

In block 490, the payment processing system 140 receives the user 101 facial template and the user 101 payment account information and associates the user 101 facial template with the user 101 payment account information. In an example embodiment, the payment processing system 140 receives the user 101 facial template, the facial template identifier associated with the user 101 facial template, and the user 101 payment account information used in the completed transaction from the merchant POS device 110 over the network 120. In an example embodiment, the payment processing system 140 stores the received user 101 facial template, the received facial template identifier associated with the received user 101 facial template, and the received user 101 payment information used in the completed transaction in the data storage unit 146 or other memory of the payment processing system 140. In an example embodiment, the payment processing system 140 associates the stored user 101 facial template and the stored user 101 payment information with the stored facial template identifier.

From block 490, the method 230 proceeds to block 240 in FIG. 2.

Returning to FIG. 2, in block 240, the user 101 conducts a subsequent transaction at the merchant location with facial recognition. The method for initiating a subsequent payment transaction at the merchant location is described in more detail hereinafter with reference to the method described in FIG. 4.

FIG. 4 is a block diagram depicting a method 240 for initiating, by a user 101, a subsequent payment transaction at a merchant location, in accordance with certain example embodiments. The method 240 is described with reference to the components illustrated in FIG. 1.

In block 510, the user 101 arrives at a merchant POS device 110. In an example embodiment, the user 101 shops at the merchant location, selects one or more items and/or services for purchase and presents the items and/or services to the merchant POS device operator 102 for purchase at a checkout area of the merchant location. In an example embodiment, the user 101 in the subsequent payment transaction is the same user 101 which conducted the completed transaction as described herein in blocks 310-380. In an example embodiment, the merchant POS device 110 in the subsequent payment transaction is the same merchant POS device 110 involved in the completed transaction as described herein in blocks 310-380. In another example embodiment, the merchant POS device 110 in the subsequent payment transaction is a different merchant POS device 110 from the merchant POS device 110 involved in the completed transaction as described herein in blocks 310-380. For example, the merchant POS device 110 in the subsequent payment transaction is a different merchant POS device 110 at the same merchant location as the merchant POS device 110 involved in the completed transaction. In another example, the merchant POS device 110 in the subsequent payment transaction is a different merchant POS device 110 at a different merchant location than the merchant location where the merchant POS device 110 involved in the completed transaction is located.

In block 520, the merchant POS device operator 102 totals items of the user 101 for purchase. For example, the merchant POS device operator 102 scans barcodes or other machine-readable identifiers attached to the items via the merchant POS device 110 or otherwise inputs information associated with the items into the merchant POS device 110. In an example embodiment, the merchant POS device 110 displays a total amount for the transaction. In this example embodiment, the merchant POS device 110 may display information associated with each item such as a price, description of the item, and a quantity of the item.

In block 530, the merchant POS device 110 displays a request for the user 101 to pay using facial recognition. For example, the merchant POS device 110 displays, via the user interface 115, a request that reads "would you like to pay using facial recognition?" or other appropriate language that requests user 101 permission to capture a user 101 facial image and identify stored payment account information based on a user 101 facial template derived from the user 101 facial image. In an example embodiment, the user 101 may ask the merchant POS device operator 102 for information about making payments via facial recognition to help in deciding whether or not to approve the request. In an example, the merchant POS device 110 displays a first object on the user interface 115 that, when selected, indicates that the user 101 allows payment via facial recognition and a second object on the user interface 115 that, when selected, indicates that the user 101 does not consent to payment via facial recognition.

In block 535, the user 101 decides whether to accept or decline the request to pay using facial recognition.

If the user 101 declines to pay using facial recognition, the method 240 proceeds to block 540. In an example embodi-ment, if the user 101 declines to pay using facial recognition, the user 101 may select a payment option and provide payment account information via a payment card or otherwise provide payment account information to the merchant POS device 110 to use in a transaction.

In block 540, the merchant POS device operator 102 selects an option on the merchant POS device 110 not to determine payment account information based on facial recognition. In an example embodiment, the merchant POS device operator 102 selects an object displayed on the user interface 115 that indicates that the user 101 does not want to pay via facial recognition or otherwise does not want to determine payment account information based on facial recognition.

In block 550, the merchant POS device 110 displays a request for payment account information. In an example embodiment, the merchant POS device 110 receives an input of the selection of the user interface 115 object indicating the user's 101 denial of the request to determine payment information based on facial recognition of the user 101. In this example embodiment, in response to receiving the input of the selection of the user interface 115 object indicating the user's 101 denial of the request to determine payment information based on facial recognition of the user 101, the merchant POS device 110 displays a request for payment account information associated with a user 101 payment account.

In block 560, the user 101 selects a payment option and provides payment information. For example, the merchant POS device operator 102 asks the user 101 to select a payment option. In an example embodiment, the merchant POS device 110 displays, via a user interface 115 of the merchant POS device 110, one or more objects on the user interface 115 corresponding to one or more forms of payment accepted at the merchant location. A payment option may comprise payment by cash, payment by credit card, payment by bank account, payment by store account, payment by check, or any other form of payment accepted by the merchant system for purchase transactions at the merchant location. In an example embodiment, the user 101 selects a payment option and provides payment account information. For example, the user 101 selects a payment option to pay via credit card and provides the credit card or otherwise provides payment account information associated with the credit account to the merchant POS device operator 102. In an example embodiment, the merchant POS device 110 operator may swipe a payment card, for example a credit card, debit card, gift card, store card, or other payment card, at a card reader of the merchant POS device 110 to transmit payment account information from the payment card to the merchant POS device 110. For example, the payment card may comprise a magnetic stripe or chip that is read by a card reader of the merchant POS device 110. In another example embodiment, the merchant POS device 110 operator may scan a check provided by the user 101 or otherwise enter account information associated with a bank account of the user into the merchant POS device 110

In block 570, the merchant POS device 110 processes a transaction. In an example, the merchant POS device 110 transmits a payment authorization request to an issuer system 130 associated with the payment account information. In an example embodiment, the merchant POS device 110 generates a payment authorization request comprising the user 101 payment account information provided by the user, merchant system payment account information, and a total amount of the transaction. In an example embodiment, the issuer system 130 receives the payment authorization request from the merchant POS device 110 via the network 120. In another example embodiment, the merchant POS device 110 transmits transaction details to the payment processing system 140 and the payment processing system 140 generates the payment authorization request and transmits the payment authorization request to the issuer system 130. For example, the merchant POS device 110 transmits transaction details to the payment processing system 140 comprising a transaction total, an account identifier of the merchant system, and the payment account information provided by the user 101. In this example embodiment, the payment processing system 140 receives the transaction details over the network 120. In this example embodiment, the payment processing system 140 transmits a payment authorization request to the issuer system 130. In this example embodiment, the payment processing system 140 generates a payment authorization request comprising user 101 payment account information, merchant system payment account information, and a total amount of the transaction. In an example embodiment, the issuer system 130 receives the payment authorization request from the payment processing system 140 via the network 120.

In an example embodiment, the issuer system 130 receives the payment authorization request and approves the payment authorization request. In an example embodiment, the issuer system 130 receives the payment authorization request from the payment processing system 140 or from the merchant POS device 110 via the network 120. In an example embodiment, the issuer system 130 approves the payment authorization request and transmits a payment authorization approval notice to the payment processing system 140 or to the merchant POS device 110. In an example embodiment, the issuer system 130 subtracts the user's 101 current account balance from the user's 101 credit limit associated with the user's 101 payment account. In this example, if the different between the credit limit and the credit balance is a positive number greater than the total amount of the transaction, the issuer system 130 approves the payment authorization. For example, the user 101 will not exceed his credit limit if the transaction were to be approved, therefore the issuer system 130 approves the payment authorization request. In an example embodiment, the payment processing system 140 or the merchant POS device 110 receives the payment authorization approval from the issuer system 130. In another example embodiment, the payment processing system 140 or merchant POS device 110 receives a denial of the payment authorization request in response to the issuer system 130 declining the payment authorization request. In an example embodiment, if the issuer system 130 approves the payment authorization request, the issuer system 130 credits the merchant system account and adds a charge to the user 101 credit account, bank account or other payment account used by the user 101 in the transaction.

In an example, the merchant POS device 110 receives a notice of approval of the payment authorization request from the issuer system 130. For example, the issuer system 130 generates the notice of approval of the payment authorization request and transmits the notice of approval of payment authorization request to the merchant POS device 110 via the network 120. In another example, the payment processing system 140 transmits the notice of approval of payment authorization request to the payment processing system 140 via the network 120 and the payment processing system 140 transmits the notice to the merchant POS device 110 via the network 120. The merchant POS device 110 may transmit a receipt to the user 101. For example, the merchant POS device 110 transmits the receipt to a user computing device associated with the user 101 for display on the user computing device. In another example, the merchant POS device 110 prints a receipt comprising a summary of the transaction via a printer device that is a component of or otherwise communicatively coupled to the merchant POS device 110.

Returning to block 535, if the user 101 accepts the request to pay using facial recognition, the method 240 proceeds to block 580.

In block 580, the merchant POS device operator 102 selects an option on the merchant POS device 110 to determine payment information based on facial recognition. In an example embodiment, the merchant POS device operator 102 selects an object displayed on the user interface 115 that indicates that the user 101 approves the request to pay via facial recognition or otherwise wants to determine payment account information based on facial recognition.

In block 590, the merchant POS device 110 processes a subsequent transaction based on facial recognition of the user 101. The method for processing a subsequent payment transaction with payment information determined based on facial recognition of a user 101 is described in more detail hereinafter with reference to the method 590 described in FIG. 6.

FIG. 6 is a block diagram depicting a method 590 for processing a subsequent payment transaction with payment information determined based on facial recognition of a user 101, in accordance with certain example embodiments. The method 590 is described with reference to the components illustrated in FIG. 1.

In block 610, the merchant POS device 110 captures a facial image of the user 101. In an example embodiment, the merchant POS device operator 102 instructs the user 101 position the user's 101 face such that a camera device 111 of the merchant POS device 110 or a camera device 111 otherwise communicatively coupled to the merchant POS device 110 may capture a facial image of the user 101. In this example embodiment, the user 101 positions himself so that the camera device 111 may capture a facial image of the user 101 in response to a selection by the merchant POS device operator 102 of a user interface 115 object. In an example, the merchant POS device 110 captures a facial image of the user 101. For example, in response to receiving an input of a selection of the option to associate the user 101 payment account information with a user 101 facial template, the merchant POS device 110 activates a camera device 111 of the merchant POS device 110 or activates a camera device 111 communicatively coupled to the merchant POS device 110.

In an example embodiment, in response to receiving the input of the selection of the option to pay via facial recognition, the merchant POS device 110 begins to capture photo images and/or a video of the surroundings of the camera device 111 via the camera device 111. In an example embodiment, the merchant POS device 110 captures a video feed of the user's 101 face via the camera device 111. In another example embodiment, the merchant camera device 1110 continuously captures, but does not record, a video feed of its surroundings via the camera device 111. In this example embodiment, in response to receiving the input of the selection of the option to associate the user 101 payment account information with a user 101 facial template, the merchant POS device 110, via the camera device 111, begins to record the video feed for a threshold amount of time. In an example embodiment, the user 101 may be moving during the period in which the camera device 111 records the video feed. In an example embodiment, a processor of the camera device 111 extracts a facial image by determining a particular frame of the video feed and area of the instance of the video feed corresponding to the face of the user 101. In an example embodiment, the camera device 111 extracts a facial image of the user 101 from the captured video. In an example embodiment, the camera device 111 determines a frame of the captured video to provide an image of the user's 101 face and extracts the frame of the captured video comprising the facial image of the user 101.

In block 620, the merchant POS device 110 generates a user 101 facial template based on the user 101 facial image. In an example, the facial template is of a predetermined size, for example, a 128-byte facial template. In an example, the merchant POS device 110 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example, the facial template may describe key features of the facial image of the user 101, such as shape, color, line, value, space, form, texture, or other useful or relevant feature of the image or of particular regions of the image.

In block 630, the merchant POS device 110 searches for a stored user 101 facial template matching the generated user 101 facial template. In an example embodiment, the merchant POS device 110 searches for a stored facial template matching the generated user 101 facial template in a data storage unit 116 associated with the merchant POS device 110. For example, the merchant POS device 110 database may comprise a log of facial templates. In an example embodiment, the merchant POS device 110 searches for a stored user 101 facial template matching the generated user 101 facial template in a memory or data storage unit accessible both by the merchant POS device 110 and by one or more other merchant POS devices 110 at the merchant system location. In another example embodiment, the merchant POS device 110 searches for the stored user 101 facial template matching the generated user 101 facial template in a memory or data storage unit accessible by the merchant POS device 110, by one or more other merchant POS devices 110 at the merchant system location at which the completed transaction was conducted, and/or by one or more merchant POS devices 110 at one or more other merchant system locations other than the merchant system location at which the completed transaction was conducted. As previously discussed, the completed transaction comprises the transaction wherein the user 101 facial template was associated with user 101 payment account information used in the completed transaction. For example, the memory or data storage device may be a data storage unit 116 on or communicatively coupled to the merchant POS device 110 or may be a memory or data storage unit accessible via the network 120.

In an example embodiment, to find a stored user 101 facial template matching the generated user 101 facial template, the merchant POS device 110 compares one or more regions of the generated user 101 facial template against one or more corresponding regions of each of the stored user 101 facial templates in one or more memories or data storage units accessible by the merchant POS device 110 until the merchant POS device 110 finds a stored user 101 facial template matching the generated user 101 facial template. In an example, the generated user 101 facial template and stored user 101 facial templates comprise computer code representations of corresponding digital facial images upon which the generated user 101 facial template and the stored user 101 facial templates were based. For example, each user 101 facial template may describe key features of the facial image of the user 101, such as shape, color, line, value, space, form, texture, or other useful or relevant feature of the image or of particular regions of the image. For example, each facial template was generated by processing the facial image through a convolutional neural network. In an example, the facial template may describe key features of the facial image of the user 101, such as shape, color, line, value, space, form, texture, or other useful or relevant feature of the image or of particular regions of the image.

In block 635, the merchant POS device 110 determines whether the merchant POS device 110 found a stored user 101 facial template matching the generated user 101 facial template or did not find a stored user 101 facial template matching the generated user 101 facial template. In an example embodiment, the merchant POS device 110 searches for a stored facial template matching the generated user 101 facial template in a data storage unit 116 associated with or otherwise accessible to the merchant POS device 110 by comparing the generated user 101 facial template against each of the stored user 101 facial templates until finding a matching stored user 101 facial template that matches the generated user 101 facial template. In an example embodiment, the matching stored user 101 facial template is an exact match of the generated user 101 facial template. In another example embodiment, the matching stored user 101 facial template substantially matches the generated user 101 facial template. For example, to substantially match, the similarity between the generated user 101 facial template and the matching stored user 101 facial template must be greater than a threshold similarity. For example, the threshold similarity is 95 percent or another appropriate threshold similarity determined by the merchant system. In an example embodiment, the merchant system may configure the threshold similarity. For example, configuring a greater threshold similarity may increase the security of the transaction and the certainty that the user 101 conducting the current transaction is the same user 101 that conducted the previous, completed transaction. However, configuring a greater threshold similarity may result in a situation in which generated facial template of the user 101 does not match any stored user 101 facial templates even though the merchant POS device 110 previously stored a user 101 facial template for the user 101. In another example, configuring a lesser threshold similarity may result in less occurrences of the situation in which the generated facial template of the user 101 does not match any stored user 101 facial templates even though the merchant POS device 110 previously stored a user 101 facial template for the user 101. However, configuring a lesser threshold similarity may also result in less security for the transaction. In other example embodiments, to substantially match, the difference between the generated user 101 facial template and the matching stored user 101 facial template must be less than a threshold difference. For example, the threshold difference is five percent or other appropriate threshold difference determined by the merchant system.

If the merchant POS device 110 does not find a stored user 101 facial template matching the generated user 101 facial template, the method 590 returns to block 330 in FIG. 3. For example, the merchant POS device 110 does not find a stored user 101 facial template that exactly or substantially matches the generated user 101 facial template. For example, none of the stored user 101 facial templates comprises a similarity of greater than a 95 percent threshold similarity when compared to the generated user 101 facial template, therefore the merchant POS device 110 determines that the merchant POS device 110 cannot find a stored user 101 facial template matching the generated user 101 facial template.

Returning to FIG. 6, in block 635, if the merchant POS device 110 finds a stored user 101 facial template matching the generated user 101 facial template, the method 590 proceeds to block 640. For example, the merchant POS device 110 finds a stored user 101 facial template that exactly or substantially matches the generated user 101 facial template. For example, the merchant POS device 110 finds a matching stored user 101 facial template that comprises a similarity of greater than a 95 percent threshold similarity when compared to the generated user 101 facial template, therefore the merchant POS device 110 determines that the merchant POS device 110 found a stored user 101 facial template matching the generated user 101 facial template.

In block 640, the merchant POS device 110 transmits a request for stored payment account information associated with the matching stored user 101 facial template to the payment processing system 140. In an example embodiment, the merchant POS device 110 extracts a stored user 101 facial template identifier associated with the matching stored user 101 facial template and transmits, to the payment processing system 140 via the network 120, a request for stored payment account information associated with the stored user 101 facial template identifier. In another example embodiment, the merchant POS device 110 transmits the matching stored user 101 facial template to the payment processing system 140 via the network 120 along with a request for stored payment account information associated with the matching stored user 101 facial template. In yet another example embodiment, the merchant POS device 110 transmits both the matching stored user 101 facial template and the stored user 101 facial template identifier associated with the matching stored user 101 facial template to the payment processing system 140 via the network 120 along with a request for stored payment account information associated with the matching stored user 101 facial template.

In an example embodiment, the payment processing system 140 receives the request for stored payment account information and the received user 101 facial template identifier and/or the received user 101 facial template via the network 120 from the merchant POS device 110. In an example embodiment, the payment processing system 140 identifies and extracts payment account information associated with the received user 101 facial template or the received user 101 facial template identifier from a data storage unit or memory accessible to the payment processing system 140. For example, the payment processing system 140 stores a list a user 101 facial template identifiers and corresponding stored payment account information associated with each respective user 101 facial template identifier. For example, the payment processing system 140 searches the list to identify a user 101 facial template identifier matching the received user 101 facial template identifier. In this example, the payment processing system 140 extracts the stored payment account information associated with the matching user 101 facial template identifier.

In certain example embodiments, the payment processing system 140 processes a transaction using the extracted payment account information associated with the user 101 facial template. In this example embodiment, the payment processing system 140 requests transaction details from the merchant POS device 110 via the network 120. In this example embodiment, the merchant POS device 110 receives the request for transaction details from the payment processing system 140 via the network 120 and transmits transaction details to the payment processing system 140 via the network 120. Example transaction details may comprise a total amount of transaction, a merchant system payment account identifier, and any other information necessary to process a transaction involving the extracted user 101 payment account information and the merchant system payment account information. In an example embodiment, the payment processing system transmits a payment authorization request to the issuer system 130. In this example embodiment, the payment processing system 140 generates a payment authorization request comprising the extracted user 101 payment account information, merchant system payment account information received in the transaction details, and a total amount of the transaction received in the transaction details. In an example embodiment, the issuer system 130 receives the payment authorization request from the payment processing system 140 via the network 120. In an example embodiment, the issuer system 130 receives the payment authorization request from the payment processing system 140 or from the merchant POS device 110 via the network 120. In an example embodiment, the issuer system 130 approves the payment authorization request and transmits a payment authorization approval notice to the payment processing system 140 or to the merchant POS device 110. In an example embodiment, the issuer system 130 subtracts the user's 101 current account balance from the user's 101 credit limit associated with the user's 101 payment account. In this example, if the different between the credit limit and the credit balance is a positive number greater than the total amount of the transaction, the issuer system 130 approves the payment authorization. For example, the user 101 will not exceed his credit limit if the transaction were to be approved, therefore the issuer system 130 approves the payment authorization request. In an example embodiment, the payment processing system 140 or the merchant POS device 110 receives the payment authorization approval from the issuer system 130. In another example embodiment, the payment processing system 140 or merchant POS device 110 receives a denial of the payment authorization request in response to the issuer system 130 declining the payment authorization request. In an example embodiment, if the issuer system 130 approves the payment authorization request, the issuer system 130 credits the merchant system account and adds a charge to the user 101 credit account, bank account or other payment account used by the user 101 in the transaction.

In an example, the merchant POS device 110 receives a notice of approval of the payment authorization request from the issuer system 130. For example, the issuer system 130 generates the notice of approval of the payment authorization request and transmits the notice of approval of payment authorization request to the merchant POS device 110 via the network 120. In another example, the payment processing system 140 transmits the notice of approval of payment authorization request to the payment processing system 140 via the network 120 and the payment processing system 140 transmits the notice to the merchant POS device 110 via the network 120. The merchant POS device 110 may transmit a receipt to the user 101. For example, the merchant POS device 110 transmits the receipt to a user computing device associated with the user 101 for display on the user computing device. In another example, the merchant POS device 110 prints a receipt comprising a summary of the transaction via a printer device that is a component of or otherwise communicatively coupled to the merchant POS device 110.

In certain other example embodiments, as described in blocks 650-690, however, the payment processing system 140 does not process the transaction after extracting the user 101 payment account information and instead transmits the extracted user 101 payment account information to the merchant POS device 110 for the merchant POS device 110 to process the transaction.

In block 650, the merchant POS device 110 receives stored payment account information associated with the matching stored user 101 facial template from the payment processing system 140. In an example embodiment, the payment processing system 140 transmits, via the network 120 and to the merchant POS device 110, the extracted payment account information associated with the matching user 101 facial template identifier. For example, the payment processing system 140 received the user 101 facial template and/or the user 101 facial template identifier from the merchant POS device 110 via the network 120 along with a request for user 101 payment account information associated with the received user 101 facial template and the payment processing system 140 extracts payment account information associated with the received user 101 facial template or received user 101 facial template identifier and transmits the extracted payment account information to the merchant POS device 110 via the network 120. In an example embodiment, the merchant POS device 110 receives the payment account information associated with the matching stored user 101 facial template and/or associated with the transmitted user 101 facial template identifier from the payment processing system 140 via the network 120.

In another example embodiment, in which the merchant POS device 110 stores user 101 account information and associates the user 101 payment account information from the completed transaction with the user 101 facial template, the merchant POS device 110 does not transmits a request for stored payment account information associated with the matching stored user 101 facial template to the payment processing system 140. Instead, in this example embodiment, the merchant POS device 110 extracts the stored user 101 payment account information associated with the stored user 101 facial template that matches the generated user 101 facial template. In this example embodiment, the merchant POS device 110 does not communicate with the payment processing system 140 to retrieve the stored user 101 payment account information associated with the stored user 101 facial template matching the generated user 101 facial template. For example, the merchant POS device 110 extracts the user 101 payment account information from the completed transaction associated with the stored user 101 facial template matching the generated user 101 facial template from a memory or data storage unit accessible by the merchant POS device 110.

In block 660, the merchant POS device 110 transmits a payment authorization request to the issuer system 130 associated with the received payment information. In an example embodiment, the merchant POS device 110 generates a payment authorization request comprising the user 101 payment account information provided by the user, merchant system payment account information, and a total amount of the transaction. In an example embodiment, the issuer system 130 receives the payment authorization request from the merchant POS device 110 via the network 120.

In block 670, the issuer system 130 receives the payment authorization request and approves the payment authorization request. In an example embodiment, the issuer system 130 receives the payment authorization request from the merchant POS device 110 via the network 120. In an example embodiment, the issuer system 130 approves the payment authorization request and transmits a payment authorization approval notice to the payment processing system 140 or to the merchant POS device 110. In an example embodiment, the issuer system 130 subtracts the user's 101 current account balance from the user's 101 credit limit associated with the user's 101 payment account. In this example, if the different between the credit limit and the credit balance is a positive number greater than the total amount of the transaction, the issuer system 130 approves the payment authorization. For example, the user 101 will not exceed his credit limit if the transaction were to be approved, therefore the issuer system 130 approves the payment authorization request. In an example embodiment, the payment processing system 140 or the merchant POS device 110 receives the payment authorization approval from the issuer system 130. In another example embodiment, the payment processing system 140 or merchant POS device 110 receives a denial of the payment authorization request in response to the issuer system 130 declining the payment authorization request. In an example embodiment, if the issuer system 130 approves the payment authorization request, the issuer system 130 credits the merchant system account and adds a charge to the user 101 credit account, bank account or other payment account used by the user 101 in the transaction.

In block 680, the merchant POS device 110 receives notice of an approved payment authorization request from the issuer system 130. For example, the issuer system 130 generates the notice of approval of the payment authorization request and transmits the notice of approval of payment authorization request to the merchant POS device 110 via the network 120. In another example, the payment processing system 140 transmits the notice of approval of payment authorization request to the payment processing system 140 via the network 120 and the payment processing system 140 transmits the notice to the merchant POS device 110 via the network 120.

In block 690, the merchant POS device 110 transmits a receipt to the user. For example, the merchant POS device 110 transmits the receipt to a user computing device associated with the user 101 for display on the user computing device. In another example, the merchant POS device 110 prints a receipt comprising a summary of the transaction via a printer device that is a component of or otherwise communicatively coupled to the merchant POS device 110.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify appropriate account information for use in service requests based on facial recognition of users, comprising:
receiving, by a service provider computing device, account information associated with a user account and a request to process a first service request;
processing, by the service provider computing device, the first service request using the account information associated with the user account;
capturing, by the service provider computing device and via a camera device communicatively coupled to the service provider computing device, a first image of the user associated with the user account;
generating, by the service provider computing device, a first template comprising a computer code representation of the first image of the user;
deleting, by the service provider computing device, the first image of the user associated with the user account;
generating, by the service provider computing device, a template identifier associated with the first template;
transmitting, by the service provider computing device, the template identifier and the account information associated with the user account to one or more computing devices;
receiving, by the service provider computing device, a request to process a second service request;
capturing, by the service provider computing device and via the camera device, a second image of the user;
generating, by the service provider computing device, a second template based on the second image of the user;
identifying, by the service provider computing device, the first template from among a plurality of templates comprising the first template stored on the memory by comparing each template of the plurality of templates comprising the first template against the second template, wherein the similarity of the first template to the second template is greater than a threshold amount;

determining, by the service provider computing device, the template identifier associated with the first template;

transmitting, to the one or more computing devices by the service provider computing device, the template identifier and a request for the account information associated with the user account;

receiving, by the service provider computing device and from the one or more computing devices, the requested account information associated with the user account, wherein the one or more computing devices transmit the account information associated with the template identifier; and processing, by the service provider computing device, the requested second service request using the received account information.

2. The method of claim 1, wherein the first image of the user comprises a first facial image of the user and wherein the second image of the user comprises a second facial image of the user.

3. The method of claim 1, wherein processing the first service request comprises processing a first transaction using the account information, and wherein processing the second service request comprises processing a second transaction using the account information.

4. The method of claim 1, wherein comparing each template of the plurality of templates comprising the first template against the second template comprises comparing one or more particular regions of each template against the one or more corresponding particular regions of the second template.

5. The method of claim 1, wherein the first template and the second template comprise computer code representations of the first user image and the second user image, respectively.

6. The method of claim 1, further comprising storing, by the service provider computing device, the first template and the template identifier associated with the first template.

7. The method of claim 1, wherein capturing at least one of the first image of the user and the second image of the user comprises capturing a video feed of a face of the user or surroundings of the camera device and a facial image of the user is extracted from the captured video feed by determining a particular frame of the video feed and area of the instance of the video feed corresponding to the face of the user and extracting the particular frame of the captured video.

8. A computer program product to identify appropriate account information for use in service requests based on facial recognition of users, comprising:

a non-transitory computer-readable medium having computer-executable program instructions embodied thereon that when executed by a computer cause the computer to:

generate a first template comprising a computer code representation of a first image of a user;

generate a template identifier associated with the first template;

transmit the template identifier and account information associated with an account of the user to one or more computing devices;

receive a request to process a service request;

capture, via a camera device, a second image of the user;

generate a second template based on the second image of the user;

identify the first template from among a plurality of templates comprising the first template stored on a memory by comparing each template of the plurality of templates comprising the first template against the second template, wherein a similarity of the first template to the second template is greater than a threshold amount;

determine the template identifier associated with the first template;

transmit, to the one or more computing devices, the template identifier and a request for the account information associated with the account;

receive, from the one or more computing devices, the account information associated with the user account, wherein the one or more computing devices transmit the account information associated with the template identifier; and process the requested service request using the received account information.

9. The computer program product of claim 8, wherein the non-transitory computer-readable medium further comprises computer-executable program instructions embodied thereon that when executed by the computer cause the computer to:

receive, at a time before generating the first template, the account information associated with the user account and a request to process a prior service request;

process the prior service request using the account information associated with the account;

capture, via the camera device the first image of the user associated with the user account, the camera device communicatively coupled to the service provider computing device; and at a time after generating the first template, delete the first image of the user associated with the account.

10. The computer program product of claim 9, wherein processing the prior service request comprises processing a first transaction using the account information, and wherein processing the service request comprises processing a second transaction using the account information.

11. The computer program product of claim 8, wherein the non-transitory computer-readable medium further comprises computer-executable program instructions embodied thereon that when executed by the computer cause the computer to store the first template and the template identifier associated with the first template.

12. The computer program product of claim 8, wherein the first image of the user comprises a first facial image of the user and wherein the second image of the user comprises a second facial image of the user.

13. The computer program product of claim 8, wherein comparing each template of the plurality of templates comprising the first template against the second template comprises comparing one or more particular regions of each template against the one or more corresponding particular regions of the second template.

14. The computer program product of claim 8, wherein the first template and the second template comprise computer code representations of the first user image and the second user image, respectfully.

15. The computer program product of claim 8, wherein capturing at least one of the first image of the user and the second image of the user comprises capturing a video feed of the face of the user or surroundings of the camera device and the computer-executable program instructions comprises computer-executable program instructions to extract a facial image of the user from the captured video feed by determining a particular frame of the video feed and area of the instance of the video feed corresponding to the face of the user and extracting the particular frame of the captured video.

16. A system to identify appropriate account information for use in service requests based on facial recognition of users, comprising:
  a storage device; and
  a processor communicatively coupled to the storage device, wherein the processor executes application code instructions that are stored in the storage device to cause the system to:
    generate a first template comprising a computer code representation of a first image of a user;
    generate a template identifier associated with the first template;
    transmit the template identifier and account information associated with an account associated with the user to one or more computing devices;
    receive a request to process a service request;
    capture, via a camera device, a second image of the user;
    generate a second template based on the second image of the user;
    identify the first template from among a plurality of templates comprising the first template stored on a memory by comparing each template of the plurality of templates comprising the first template against the second template, wherein a similarity of the first template to the second template is greater than a threshold amount;
    determine the template identifier associated with the first template;
    transmit, to the one or more computing devices, the template identifier and a request for the account information associated with the user account;
    receive, from the one or more computing devices, the requested account information associated with the account, wherein the one or more computing devices transmit the account information associated with the template identifier; and
    process the requested service request using the received account information.

17. The system of claim 16, wherein the processor is further configured to execute computer-readable program instructions stored in the storage device to cause the system to store the first template and the template identifier associated with the first template.

18. The system of claim 16, wherein the first image of the user comprises a first facial image of the user and wherein the second image of the user comprises a second facial image of the user.

19. The system of claim 16, wherein processing the service request comprises processing a transaction using the received account information.

20. The system of claim 16, wherein comparing each template of the plurality of templates comprising the first template against the second template comprises comparing one or more particular regions of each template against the one or more corresponding particular regions of the second template.

21. The system of claim 16, wherein the first template and the second template comprise computer code representations of the first user image and the second user image, respectfully.

22. The system of claim 16, wherein capturing at least one of the first image of the user and the second image of the user comprises capturing a video feed of a face of the user or surroundings of the camera device and the application code instructions that are stored in the storage device further cause the system to extract a facial image of the user from the captured video feed by determining a particular frame of the video feed and area of the instance of the video feed corresponding to the face of the user and extracting the particular frame of the captured video.

* * * * *